United States Patent
Jaekel et al.

(10) Patent No.: US 12,384,368 B2
(45) Date of Patent: Aug. 12, 2025

(54) ADAPTIVE CRUISE CONTROL

(71) Applicant: Five AI Limited, Bristol (GB)

(72) Inventors: Steffen Jaekel, Bristol (GB); Alexandre Oliveira E Silva, Bristol (GB); Bence Magyar, Bristol (GB); Alejandro Bordallo Mico, Bristol (GB); Marco Andrea Ferri, Bristol (GB)

(73) Assignee: Five AI Limited, Cambridge (GB)

( * ) Notice: Subject to any disclaimer, the term of this patent is extended or adjusted under 35 U.S.C. 154(b) by 563 days.

(21) Appl. No.: 17/774,135

(22) PCT Filed: Nov. 4, 2020

(86) PCT No.: PCT/EP2020/080938
§ 371 (c)(1),
(2) Date: May 3, 2022

(87) PCT Pub. No.: WO2021/089608
PCT Pub. Date: May 14, 2021

(65) Prior Publication Data
US 2022/0402491 A1  Dec. 22, 2022

(30) Foreign Application Priority Data
Nov. 4, 2019 (GB) .................................... 1916026

(51) Int. Cl.
*B60W 30/16* (2020.01)
*B60W 10/18* (2012.01)
(Continued)

(52) U.S. Cl.
CPC .......... *B60W 30/162* (2013.01); *B60W 10/18* (2013.01); *B60W 30/0956* (2013.01);
(Continued)

(58) Field of Classification Search
CPC ............... B60W 30/162; B60W 10/18; B60W 30/0956; B60W 30/146; B60W 40/04;
(Continued)

(56) References Cited

U.S. PATENT DOCUMENTS

| | | |
|---|---|---|
| 6,418,370 B1 | 7/2002 | Isogai et al. |
| 2002/0169538 A1 | 11/2002 | Yamamura et al. |

(Continued)

FOREIGN PATENT DOCUMENTS

DE  10330922 A1  2/2005

OTHER PUBLICATIONS

International Search Report and Written Opinion mailed Feb. 24, 2021 in corresponding International PCT Patent Application No. PCT/EP2020/080938 (11 pages).

*Primary Examiner* — Donald J Wallace
(74) *Attorney, Agent, or Firm* — Andrew J. Tibbetts; Samuel S. Stone; Greenberg Traurig, LLP

(57) ABSTRACT

With respect to an adaptive cruise control method for autonomously adapting the speed of an ego vehicle (300) to maintain a target headway, headway being distance from the ego vehicle to a forward vehicle (302), the ego vehicle equipped with a perception system (100) for measuring a current headway and a current speed and acceleration of the forward vehicle relative to ego vehicle, the method may comprise: in response to detecting that the current headway is below the target headway, determining and implementing a deceleration strategy for increasing to the target headway; wherein the deceleration strategy is determined so as to selectively optimize for comfort in dependence on a predicted headway, the predicted headway computed for a future time instant based on the current speed and acceleration of the forward vehicle relative to the ego vehicle.

20 Claims, 11 Drawing Sheets

(51) Int. Cl.
*B60W 30/095* (2012.01)
*B60W 30/14* (2006.01)
*B60W 40/04* (2006.01)
*B60W 40/105* (2012.01)
*B60W 50/00* (2006.01)

(52) U.S. Cl.
CPC .......... *B60W 30/146* (2013.01); *B60W 40/04* (2013.01); *B60W 40/105* (2013.01); *B60W 50/0097* (2013.01); *B60W 50/0098* (2013.01); *B60W 2554/80* (2020.02)

(58) Field of Classification Search
CPC ........... B60W 40/105; B60W 50/0097; B60W 50/0098; B60W 2554/80; B60W 30/09; B60W 30/18159; B60W 2520/10; B60W 2554/4042; B60W 2554/802; B60W 2720/106; B60W 30/16; B60K 2031/0033
See application file for complete search history.

(56) References Cited

U.S. PATENT DOCUMENTS

2015/0012204 A1    1/2015  Breuer et al.
2019/0168756 A1    6/2019  Glück et al.
2019/0329772 A1*  10/2019  Graves .................. B60W 30/16

* cited by examiner

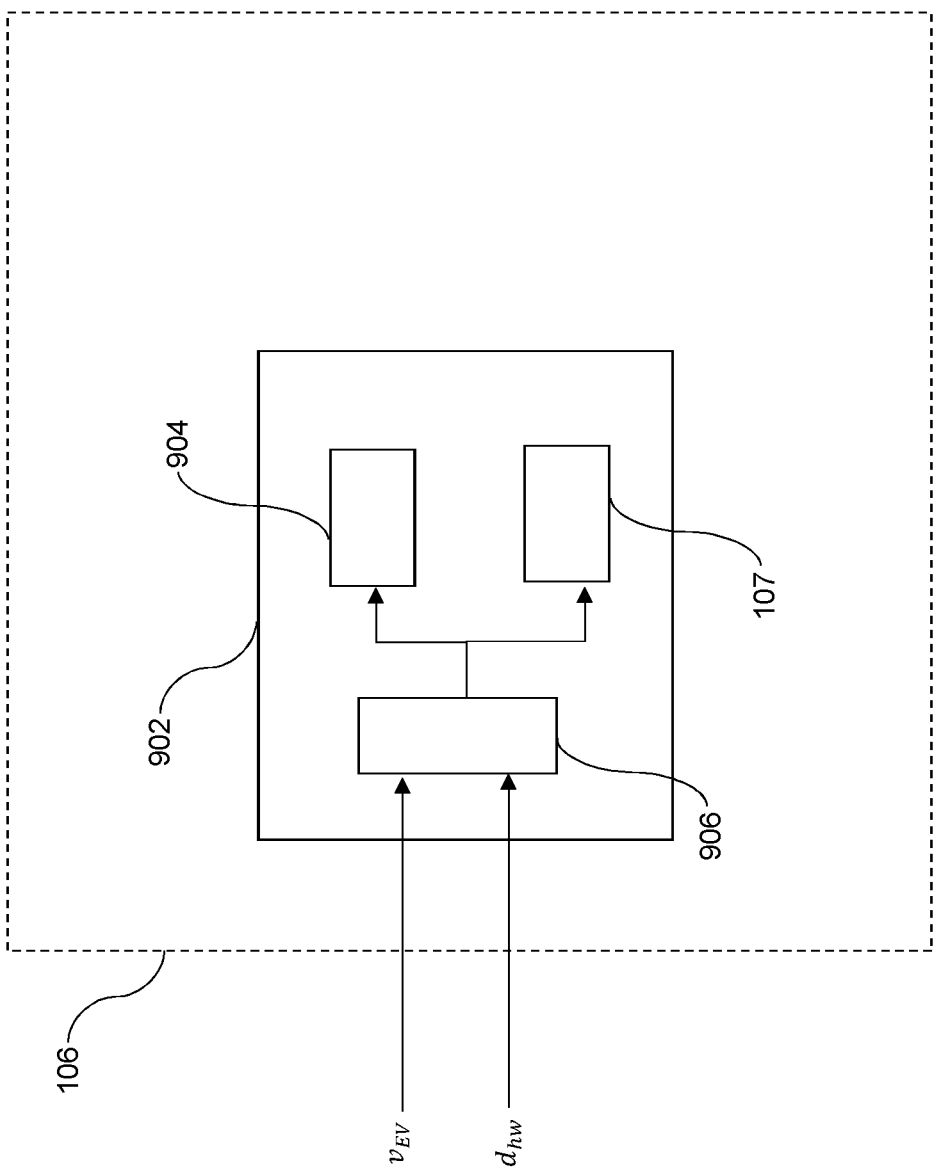

ADAPTIVE CRUISE CONTROL

CROSS-REFERENCE TO RELATED APPLICATIONS

This application is the U.S. National Stage application, pursuant to 35 U.S.C. § 371, of PCT International Patent Application No. PCT/EP2020/080938, filed Nov. 4, 2020, designating the United States and published in English, which claims priority under 35 U.S.C. §§ 119 and 365 to Great Britain Patent Application No. 1916026.6, filed Nov. 4, 2019. The contents of each of the aforementioned applications are incorporated herein by reference in their entirety.

TECHNICAL FIELD

The present invention relates to adaptive cruise control for adjusting the speed of an autonomous vehicle, which may be fully or semi-autonomous.

BACKGROUND

Cruise control is a system that automatically controls the speed of a vehicle (ego vehicle). A basic form of cruise control system maintains a constant absolute speed of the ego vehicle. A human driver must therefore take responsibility for overriding the cruise control, normally by applying the brakes, as necessary.

More sophisticated "adaptive" cruise control (ACC) aims to maintain a "target headway"—headway being distance from the ego vehicle to a vehicle immediately in front of the ego vehicle (the "forward vehicle"). In some, more sophisticated, systems, the predicted paths of external vehicles are used to anticipate when the ego vehicle will be required to adapt its speed to maintain the target headway.

An ACC system is capable of autonomously adjusting the speed of the ego vehicle based on a measured speed of the forward vehicle and a measured current headway (i.e. measured distance to the forward vehicle) with the aim of maintaining the target headway (i.e. substantially matching the current headway to the target headway, possibly up to a maximum speed threshold).

The target headway may vary in dependence on the speed of the ego vehicle. Thus, when the ego vehicle speeds up, the target headway may increase. The target headway is generally set by the driver of the ego vehicle when he activates ACC.

ACC attempts to balance matching the speed of the forward vehicle with keeping a certain distance behind the forward vehicle, where the distance between the ego vehicle and the forward vehicle is proportional to the speed of the ego vehicle. Together, these two factors ensure the ego vehicle moves with the traffic flow while staying at a safe distance behind the forward vehicle.

For example, if the forward vehicle increases its speed, the ACC system may cause the ego vehicle to accelerate to match the speed of the forward vehicle, in a way that accounts for the fact that, as the speed of the ego vehicle increases, the target headway also increases—the aim being to match the speed of the ego vehicle to the new speed of the forward vehicle, whilst maintaining a target headway appropriate for that new speed. The speed of the ego vehicle may be capped, such that it cannot increase above a certain speed. The cap may be the speed limit of the road or a maximum speed set by the driver.

If the forward vehicle were to slow down, the ACC system causes the ego vehicle to decelerate, such that the ego vehicle speed matches the new, lower speed of the forward vehicle, as well as maintaining the required headway.

Sensors are used to determine the speed of the vehicle in front and the current headway. Radar or laser sensors, for example, may be used. Cameras may also be used to determine the speed of the forward vehicle.

SUMMARY

Known cruise control systems have been found to work well on long roads on which people travel relatively fast and very few manoeuvres take place. However, the known systems may not be suitable for use in, for example, an urban setting. In such an environment, external vehicle behaviour is less constant and road layouts can prevent accurate forward vehicle data being collected by sensors.

For example, in an urban setting, vehicles pull out in front of other vehicles frequently. This may be the case when switching lanes in order to take a turning off of the road on which the vehicles are travelling, or when a vehicle turns onto a road at an intersection. In such situations, a conventional ACC system would likely detect that the headway is now below the target headway, since another vehicle has pulled into the space in front of the ego vehicle and the headway will now be measured as the distance to that vehicle. Known cruise control systems may cause the ego vehicle to suddenly brake in that event, or, in most cases, request the human driver take back control of the vehicle.

The inventors have recognized that this is often unnecessary, especially if the vehicle in front is accelerating away from the ego vehicle. In fact, the response of the ACC in that situation may even result in an unsafe situation that could have been avoided.

The present disclosure provides an adaptive cruise control process also referred to herein as "elastic ACC". In contrast to conventional ACC, elastic ACC takes into account not only the speed of the forward vehicle but also its acceleration. Elastic ACC is based on the recognition that the mere fact that a measured current headway is less than a target headway (e.g. because another vehicle has suddenly pulled out in front of the ego vehicle) does not necessarily imply that emergency measures need to be taken. Rather, that there are certain situations in which it is perfectly safe (and perhaps even safer) to implement a deceleration strategy, with the aim of reducing the current headway back to the target headway in a reasonable amount of time that is optimized for comfort.

A particular example is a situation in which a vehicle pulls out in front of the ego vehicle but accelerates rapidly away from it. Depending on the acceleration of the forward vehicle, it may be quite safe to implement a deceleration strategy that is constrained for comfort, because it is known that the high acceleration of the forward vehicle will cause the headway to rapidly increase.

A first aspect of the present invention provides a method for autonomously adapting the speed of an ego vehicle, the method comprising implementing an adaptive cruise control process (elastic ACC) with respect to a forward vehicle to maintain a target headway, headway being the distance from the ego vehicle to the forward vehicle, the ego vehicle equipped with a perception system for measuring a current headway and a current speed and acceleration of the forward vehicle relative to ego vehicle, by:

in response to detecting that the current headway is below the target headway, determining and implementing a deceleration strategy for increasing to the target headway;

wherein the deceleration strategy is determined so as to selectively optimize for comfort in dependence on a predicted headway, the predicted headway computed for a future time instant based on the current speed and acceleration of the forward vehicle relative to the ego vehicle.

Another scenario in which known cruise control systems struggle is instances in which the ego vehicle is to join a flow of traffic which is not traveling in the same direction as the ego vehicle.

For example, at roundabouts or T-junctions. This is because the sensors used monitor the behaviour of the vehicle directly in front of the ego vehicle. In these situations, there is no such vehicle and the other external vehicles are traveling with a different orientation to the ego vehicle, such that it is assumed the external vehicles are not travelling on the same path as the ego vehicle. This is not the case on, for example, a roundabout, where the forward vehicle has a different orientation to the ego vehicle but is travelling along the same path around the roundabout.

Embodiments of the invention may address this and similar scenarios. Planning a path for the ego vehicle and using the planned path to determine whether to implement the ACC process and/or to identify the forward vehicle with respect to which the ACC process is applied.

The forward vehicle may be identified as a vehicle which is determined to be travelling along substantially the same planned path in the same direction as the ego vehicle over a given time interval immediately in front of the ego vehicle.

For example, having planned the ego vehicle path, a determination can then be made of whether another vehicle is following substantially the same path in the same direction as the ego vehicle—elastic ACC is not applied for external vehicles travelling along substantially the same path but in the opposite direction (i.e. oncoming traffic). In embodiments, some other autonomous planning process may be engaged as necessary to safely plan in the presence of oncoming traffic (e.g. oncoming, overtaking vehicles), or the ego vehicle may revert to manual control. Similarly, in embodiments, elastic ACC may be applied for a vehicle determined to be "joining" the ego vehicle's planned path in front of the ego vehicle, in the same direction (e.g. a vehicle pulling out in front of the ego vehicle to join the same lane of traffic) but not for a forward vehicle expected to intersect the ego vehicle's planned path but not join it (such as a vehicle pulling out across the ego vehicle's path to join an oncoming flow of traffic as at an intersection).

The path may be non-linear, e.g. taking into account road curvature or even a path through a roundabout (e.g. from or via a point at which the ego vehicle is to enter the roundabout to or via a point at which it is predicted to exit the roundabout). The forward vehicle need not follow the same path as the as the ego vehicle for the entire path the ego vehicle takes on the roundabout. That is, the forward vehicle does not need to be on the same path from entry to the roundabout until exit from the roundabout. Instead, the forward vehicle is the vehicle determined to be travelling along substantially the same path as the ego vehicle for the immediate future. The forward vehicle may, therefore, change as the ego vehicle travels around the roundabout as external vehicle join and leave the roundabout.

References to "substantially the same path" encompass paths that are substantially aligned for a certain time interval, even when these paths deviate from each other thereafter.

Computing speed and acceleration in this way allows the ACC to perform effectively in any road layout.

Preferably, the ego vehicle is equipped with a comprehensive sensor system that encompasses a greater angular range than sensors typically used to support conventional ACC e.g. to provide essentially a full 360-degree view, although acceptable reference can be achieved with a narrower view such as approximately 180° or 270°.

The deceleration strategy may be determined so as to selectively optimize for comfort in dependence on the current headway and the predicted headway.

The method for autonomously adapting the speed of an ego vehicle may further comprise the steps of: determining a risk headway less than the target headway; and comparing the predicted headway with the risk headway, the deceleration strategy selectively optimized for comfort in dependence thereon.

The risk headway may be determined based on a measured absolute speed of the ego vehicle.

The risk headway and the predicted headway may be used to determine whether or not to impose a comfort constraint on the deceleration strategy.

The comfort constraint may limit the acceleration of the ego vehicle based on a reaction time, the reaction time determined by estimating a time until the risk headway is reached based on the current speed and acceleration of the forward vehicle relative to the ego vehicle.

The reaction time may be the lesser of the estimated time until the risk headway is reached, and a predetermined risk time. By defining a predetermined risk time, excessively slow reaction times which might be perceived as unnatural are prevented.

The estimated reaction time t may be used to compute an acceleration limit for the ego vehicle as:

$$a_{EV} = \frac{d + v_{FV}t + \frac{a_{FV}}{2}t^2 - v_{EV}(t + T_t) - d_0}{tT_t + \frac{t^2}{2}},$$

where d is the current headway, $v_{FV}$ is a current absolute speed of the forward vehicle, $a_{FV}$ is a current absolute acceleration of the forward vehicle, $v_{EV}$ is a current absolute speed of the ego vehicle, $T_t$ is a predetermined time value, and $d_0$ is a predetermined distance value. The values of $T_t$ and $d_0$ used may be experimentally tuned.

The acceleration of the ego vehicle may be limited to $a_{EV}$ in the case that $a_{EV} \leq 0$ but to zero in the event that $a_{EV} > 0$.

If both the current headway and the predicted headway are above the risk headway, the comfort constraint may be imposed; and if either of the current headway or the predicted headway is below the risk headway, the comfort constraint may not be imposed.

In the case that the comfort constraint is not imposed, the deceleration strategy may comprise initiating an emergency braking procedure.

The emergency braking procedure may implement sufficiently aggressive braking such that the ego vehicle can be brought to a complete halt before reaching a current location of the forward vehicle.

The future time instant may be a fixed duration from a current time instant at which the current headway and the current speed and acceleration of the forward vehicle relative to the ego vehicle are measured.

In the following description, two interchangeable "double subscript" notations are used, namely $x_{y\_z}$, and $x_{y_z}$. These have the same meaning, and are used interchangeably, e.g. $d_{risk\_high}$ and $d_{risk\_high}$ are synonymous. This applies to any instance of such double subscript notation, unless otherwise indicated.

The risk headway $d_{risk}$ may be computed as:

$$v_{EV} < v_{th\_slow} \rightarrow d_{risk} = d_{risk\_high}$$

$$v_{th_{slow}} \leq v_{EV} \leq v_{th\_fast} \rightarrow d_{risk} = d_{risk\_high} + \frac{d_{risk\_medium} - d_{risk\_high}}{v_{th\_fast} - v_{th\_slow}}(v_{EV} - v_{th\_slow})$$

$$v_{EV} > v_{th\_fast} \rightarrow d_{risk} = d_{risk\_medium}$$

in which:

$$d_{risk\_medium} = \max(v_{EV} \times t_{0,risk\_medium}, d_{0,risk\_medium}),$$

$$d_{risk\_high} = \max(v_{EV} \times t_{0,risk\_high}, d_{0,risk\_high}),$$

wherein $t_{0,risk\_medium}$ and $t_{0,risk\_high} < t_{0,risk\_medium}$ are predetermined time values, wherein $d_{0,risk\_medium}$ and $d_{0,risk\_high} < d_{0,risk\_medium}$ are predetermined distance values, and wherein $v_{th_{slow}}$ and $v_{th_{fast}}$ are predetermined speed thresholds.

The current speed and acceleration of the forward vehicle relative to the ego vehicle may be determined using a measured absolute speed or velocity and acceleration respectively of both the ego vehicle and the forward vehicle, the absolute acceleration of each vehicle and the absolute speed or velocity of the each vehicle provided by the perception system.

The current speed and acceleration of the forward vehicle relative to the ego vehicle may be provided directly by the perception system.

The emergency braking procedure may implement sufficiently aggressive braking such that the ego vehicle can be brought to a complete halt before reaching a current location of the forward vehicle.

According to a second aspect of the present invention, there is provided an adaptive cruise control method for autonomously adapting the speed of an ego vehicle to maintain a target headway, headway being distance from the ego vehicle to a forward vehicle, the ego vehicle equipped with a perception system for measuring a current headway and a current speed and acceleration of the forward vehicle relative to ego vehicle, the method comprising: responsive to detecting that the current headway is below the target headway, determining and implementing a deceleration strategy for increasing to the target headway; wherein the deceleration strategy is determined so as to selectively optimize for comfort in dependence on a determined risk category of the ego vehicle, the risk category determined as one of a discrete set of risk categories based on the current speed and acceleration of the forward vehicle relative to the ego vehicle.

In embodiments, the discrete set of risk categories may consist of a high risk category and a low risk category (only). In other embodiments, the discrete set of risk categories may comprise such categories and, optionally, at least one intermediate risk category. In some such embodiments, the same deceleration strategy may be adopted for the medium and high risk categories, such as emergency braking without comfort optimization or with minimal comfort optimization. In other such embodiments, a level of comfort optimization may be applied in the medium risk category that is higher than that of the high risk category (e.g. in which it may be that no or minimal comfort optimization is applied) but lower than that of the low risk category.

In a first of the predetermined risk categories (e.g. low risk), a comfort constraint may be imposed to limit the acceleration of the ego vehicle based on a reaction time, the reaction time determined by estimating a time until a risk headway is reached based on the current speed and acceleration of the forward vehicle relative to the ego vehicle. The risk headway may be less than the target headway. In a second of the predetermined risk categories (e.g. medium and/or high risk), that comfort constraint may not be imposed. For example, the second predetermined risk category may be associated with a higher level of risk than the first predetermined risk category. For example, in the second predetermined risk category, an emergency braking procedure may be applied without that comfort constraint. For example, the emergency braking procedure may be applied as set out above.

The determined risk category may be determined based on the current headway and/or a predicted headway, the predicted headway computed for a future time instant based on the current speed and acceleration of the forward vehicle relative to the ego vehicle. In such embodiments, the risk category may, for example, be determined from the discrete set of risk categories by comparing at least one of (i.e. one or both of) the current headway and the predicted headway with the risk headway. In other embodiments, the risk category may be determined differently. Irrespective of how the risk category is determined, in embodiments of the third aspect, the risk headway may be used to set the comfort constraint for the first predetermined risk category as set out above in relation to the first aspect.

If the current headway and the predicted headway are both above the risk headway the determined risk category may be the above low risk category.

If the current headway is above the risk headway and the predicted headway is below the risk headway, the determined risk category may be the above medium risk category. If the current headway is below the risk headway the determined risk category may be the above high risk category. As noted, a different deceleration strategy may or may not be adopted in the medium risk category than the low risk category.

Alternatively, if either or both of the current and predicted headways is below the risk headway, the determined risk category may be the high risk category (and a medium risk category may or may not be provided at all).

In general, any of the above features of the first aspect or any embodiments thereof may be applied in embodiments of the second aspect (irrespective of how the risk category is determined).

According to a third aspect of the present invention, there is provided a computer program comprising computer executable instructions configured, when executed, to implement any of the method as set out above.

According to a fourth aspect of the present invention, there is provided an adaptive cruise controller for autonomously adapting the speed of an ego vehicle to maintain a target headway, headway being distance from the ego vehicle to a forward vehicle, the ego vehicle equipped with a perception system for measuring a current headway and a current speed and acceleration of the forward vehicle relative to ego vehicle, the adaptive cruise controller comprising: a comparison module configured to determining if the current headway is below the target headway; and an elastic adaptive cruise control module configured to, in response to detecting that the current headway is below the target headway, determining a deceleration strategy for increasing to the target headway; and a controller configured to implementing the deceleration strategy; wherein the deceleration strategy is determined so as to selectively optimize for comfort in dependence on a predicted headway, the predicted headway computed for a future time instant based on the current speed and acceleration of the forward vehicle relative to the ego vehicle.

According to a fifth aspect of the present invention, there is provided an adaptive cruise controller comprising execution hardware configured to execute any of the method steps as set out above.

According to a sixth aspect of the present invention, there is provided a semi- or fully-autonomous vehicle equipped with any of the adaptive cruise controllers as set out above.

The vehicle may comprise a sensor system providing a coverage range between 180° and 360°. The sensor system may provide 360° coverage.

BRIEF DESCRIPTION OF THE FIGURES

To assist understanding of the present disclosure and to show how embodiments of the present invention may be put into effect, reference is made by way of example to the accompanying drawings, in which:

FIG. 9 shows example architecture for determining whether to implement elastic ACC.

DETAILED DESCRIPTION

Figure 5:
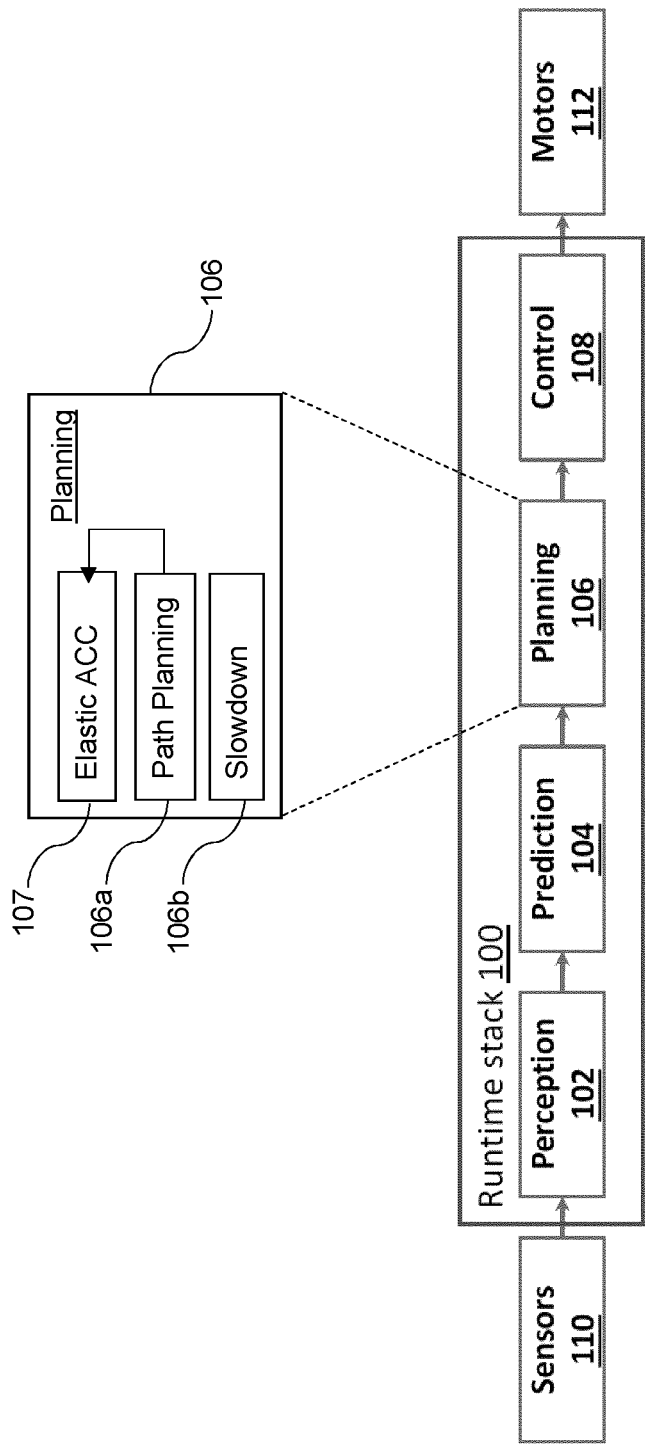
FIG. 5 shows a schematic block diagram of an autonomous vehicle runtime stack.

FIG. 5 shows a highly schematic block diagram of a runtime stack 100 for an autonomous vehicle (AV). The run time stack 100 is shown to comprise a perception stack 102, a prediction stack 104, a planner 106 and a controller 108.

The planner 106 is shown to implement an elastic ACC process 107 described in detail later. The planner 106 may implement additional autonomous planning processes/routines alongside elastic ACC 107. For example, a path planning process 106a is shown, which may be executed to plan a spatial path for the ego vehicle (e.g. to follow a particular road/lane, or to reach a desired exit at a roundabout). A "slowdown" process 106b is also shown, which is engaged to take over from elastic ACC 107 in defined circumstances as described later.

The perception stack 102 receives sensor outputs from an on-board sensor system 110 of the AV.

The on-board sensor system 110 can take different forms but generally comprises a variety of sensors such as image capture devices (cameras/optical sensors), LiDAR and/or RADAR unit(s), satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and any external actors (vehicles, pedestrians, cyclists etc.) within that environment.

Hence, the sensor outputs typically comprise sensor data of multiple sensor modalities such as stereo images from one or more stereo optical sensors, LiDAR, RADAR etc.

Stereo imaging may be used to collect dense depth data, with LiDAR/RADAR etc. proving potentially more accurate but less dense depth data. More generally, depth data collection from multiple sensor modalities may be combined in a way that respects their respective levels (e.g. using Bayesian or non-Bayesian processing or some other statistical process etc.). Multiple stereo pairs of optical sensors may be located around the vehicle e.g. to provide full 360° depth perception. This provides a much richer source of information than is used in conventional cruise control systems.

The perception stack 102 comprises multiple perception components which co-operate to interpret the sensor outputs and thereby provide perception outputs to the prediction stack 104.

The perception outputs from the perception stack 102 are used by the prediction stack 104 to predict future behaviour of the external actors.

Predictions computed by the prediction stack 104 are provided to the planner 106, which uses the predictions to make autonomous driving decisions to be executed by the AV in a way that takes into account the predicted behaviour of the external actors.

The controller 108 executes the decisions taken by the planner 106 by providing suitable control signals to on-board motors 112 of the AV. In particular, the planner 106 plans manoeuvres to be taken by the AV and the controller 108 generates control signals in order to execute those manoeuvres. Elastic ACC 107 implements a selected acceleration strategy by providing instructions to the controller 108. Under normal driving conditions, ACC accelerates and decelerates as needed to maintain a target headway. If and when the target headway us breached, a deceleration strategy is implemented which may or may not optimise for comfort (see below).

The elastic ACC techniques taught herein can be applied at any level of autonomy. The described examples consider an implementation within a sophisticated runtime stack of the kind envisaged to support level 4 or level 5 driving autonomy. However, it will be appreciated that elastic ACC can also be implemented in a semi-autonomous vehicle as a form of driver-assistance technology.

As autonomous vehicles become increasingly prevalent in human centred environments, there is a need to develop techniques which seek to provide safe driving behaviours, both for the autonomous vehicle itself and any external vehicles. There is also a need for the driving behaviours, where possible, to provide a comfortable experience for the passengers of the vehicle.

Present semi-autonomous vehicles implement adaptive cruise control (ACC) to maintain a safe distance between the vehicle and the vehicle in front. However, there are a number of problems which arise when implementing ACC in fully autonomous vehicles, as set out above. The present disclosure provides an improvement on ACC which overcomes these problems.

In conventional adaptive cruise control (ACC), an ego vehicle aims to match its velocity to that of a forward vehicle, that is the vehicle directly in front of the ego vehicle, while maintaining a target headway between itself and the forward vehicle.

When a current headway, $d_{hw}$, of the ego vehicle is above or equal to the target headway, the ego vehicle is deemed to be driving at a safe distance behind the forward vehicle. The ego vehicle aims to travel at the target headway behind the forward vehicle. Therefore, when the current headway is greater than the target headway, the ego vehicle accelerates until the current headway equals the target headway, if allowed by any laws or rules of the road. For example, the ego vehicle cannot accelerate if this would result in it breaking the speed limit or some other defined sped threshold. A driver may be able to set a maximum speed at which the ego vehicle can travel, for example, which may be e.g. lower than the speed limit.

When the current headway is lower than the target headway, conventional ACC causes the vehicle to decelerate. This may result in jerk which is uncomfortable for the passengers of the ego vehicle.

The use of the target headway alone is effective when the ego vehicle is following the same forward vehicle. This is because any sudden changes to the behaviour of the forward vehicle, such as sudden braking, should also be implemented by the ego vehicle to ensure the safety of the passengers.

However, when a forward vehicle cuts in front of the ego vehicle, such that the current headway is suddenly reduced, the above method for determining when to implement the slowdown command results in unnecessary braking by the ego vehicle. Other examples of when the current headway may suddenly be reduced include when two lanes merge and when the ego vehicle itself changes lane.

For example, when a forward vehicle joins a road along which the ego vehicle is travelling, the current headway may initially be much lower than the target headway. Additionally, the initial speed of the forward vehicle is likely to be much lower than that of the ego vehicle. Using known ACC, the ego vehicle would act to slow down as quickly as possible so that the speed of the ego vehicle matches that of the forward vehicle and the current headway matches the target headway. The combination of a suddenly much smaller current headway and substantially lower speed of the forward vehicle results in known ACC implementing sharp breaking.

However, in such a scenario, the forward vehicle is likely to quickly accelerate to match the speed of the vehicles on the road. That is, the current headway increases quickly as the forward vehicle accelerates. Therefore, it is not necessary for the ego vehicle to decelerate, or at least it is not necessary for the ego vehicle to decelerate as quickly as the difference between the current headway and the target headway may suggest.

How to react, e.g. if and how much to decelerate, to cutting-in vehicles is known to human drivers. However, the rules associated with vehicle slowdown need to be adjusted for autonomous vehicles to provide a safe and, where possible, comfortable journey for passengers.

The inventors of the present invention have devised a method for determining when and how quickly the ego vehicle should implement a slowdown command or if ACC should be implemented. It will be appreciated that, although the present disclosure uses the example of a forward vehicle cutting in in front of the ego vehicle, the method and algorithms described may be used in any situation in which the ego vehicle finds itself. This improved ACC may be referred to as Elastic ACC.

Elastic ACC

The elastic ACC process 107 will now be described.

In contrast to existing ACC, elastic ACC is sophisticated ACC performed at the planning level. That is, it is implemented in the planning layer 106 of the runtime stack 100 as shown in FIG. 5. It is designed for use in fully autonomous vehicles. As such, it needs to be able to operate in all driving scenarios, overcoming the problems with ACC set out above.

The ACC process 107 is performed with respect to an identified forward vehicle (which can change suddenly e.g. when another vehicle pulls out immediately in front of the ego vehicle). The details of how the forward vehicle is identified are described later.

The target headway with respect to the identified forward vehicle is calculated and the current headway and the target headway are compared. If the current headway is greater than the target headway, the ego vehicle either maintains its current velocity or increases it, if allowed, such that the current headway is equal to the target headway. For example, acceleration may only be allowed up to a defined speed threshold. In such a scenario, known ACC is used to determine the velocity and acceleration of the ego vehicle, and elastic ACC is not implemented, The target headway is defined by:

$$d_{target} = v_{EV} \times T_t + d_0$$

where $d_{target}$ is the target headway in meters, and $v_{EV}$ is the current velocity of the ego vehicle in m/s. As such, the target headway is comprised of a time gap $T_t$ in seconds and a static gap $d_0$ in metres. The static gap is the minimum value of the target headway. The static gap provides a rate at which the target headway increases as the velocity of the ego vehicle increase, that is, it defines how much distance needs to be added to the target headway as the ego vehicle speed increase. Values suitable for uses as the time gap and static gap may depend on the algorithms used, the quality of the actuators (e.g. the brakes) of the vehicle, and/or the road or weather conditions.

For now, suffice it to say the forward vehicle is a vehicle immediately in front of the ego vehicle determined to be travelling along substantially the same path as the ego vehicle in the same direction for the immediate future.

However, if the current headway is less than the target headway, the ego vehicle is travelling at a distance which is too close to the forward vehicle, so the ego vehicle must actively increase the current headway. Rather than implementing slowdown, as in known ACC systems, the risk is assessed and then a suitable active headway increase regime is implemented. At this stage, elastic ACC is implemented.

Headway is generally defined as the distance from the ego vehicle to the forward vehicle. Headway can be defined and measured/estimated as the distance between the front bumper of the ego vehicle and the rear bumper of the forward vehicle or some other safe rearward reference point of the forward vehicle (e.g. to accommodate trailers, rear-mounted bicycles, etc. It will be appreciated that the other more general definition of headway encompasses different possible measured distances. The numerical values given in this disclosure have been found to give good performance with headway defined as the distance from the front bumper to rear bumper, but may be modified to accommodate different definitions of headway.

The risk of the ego vehicle with respect to the forward vehicle is categorised, taking into account the present conditions of the ego and forward vehicles and the estimated conditions in a given time period. Once the risk category has been identified, a rule associated with the risk can be implemented.

The following method has been devised. This has been tested and modified using real life data in order to fine tune the user-defined values and the risk categories. The following method steps may be implemented only if the current headway is less than the target headway. In other embodiments, the following method steps are implemented even if the target headway is met.

Elastic ACC first identifies the forward vehicle. Elastic ACC is only concerned with external vehicles which are determined to be travelling along substantially the same path as the ego vehicle, and in the same direction along the path during the time period over which the elastic ACC system is considering—as noted, external vehicles which do not fall in this category are handled by other planning processes.

An arrow is shown from the path planning process 106a to the elastic ACC process 107 in FIG. 5 to represent the fact that the spatial path planned for the ego vehicle is known to the ACC process 107. Elastic ACC assumes the ego vehicle will be steered as needed to follow that path, and its rule is simply to adapt the speed of the ego vehicle appropriately.

The forward vehicle is identified as the vehicle immediately in front of the ego vehicle, which is defined to be following substantially the same spatial path as planned for the ego vehicle, in the same direction.

Once the predicted ego vehicle path has been determined, the movement of the external vehicles within the vicinity of the ego vehicle are assessed. The ego vehicle determines which, if any, of the external vehicles are travelling along substantially the same path as the ego vehicle. For example, an external vehicle which is travelling at an angle to the ego vehicle such that the paths of the two vehicles briefly intersect but the external vehicle does not continue along substantially the same path as the ego vehicle is not a forward vehicle. Nor, for example, is a vehicle travelling towards the ego vehicle in the adjacent lane in the opposite direction. The velocities of the external vehicles may be projected onto the ego vehicle path to determine if they are traveling along the path of the ego vehicle and in the same direction as the ego vehicle. The velocities, and so directions, of the external vehicle may be determined by the perception stack 102. In a lane merging scenario, two vehicle paths may be predicted to merge in the near future, and the merging paths may be considered substantially the same path for the purpose of elastic ACC.

An external vehicle which is found to be travelling on the same path as the ego vehicle and is directly in front of the ego vehicle, i.e. there are no other vehicles travelling on the ego vehicle path between the ego vehicle and said external vehicle, is determined to be the forward vehicle. The ego vehicle can then check the current headway against the target headway, as defined by the current velocity of the ego vehicle, to determine if elastic ACC should be implemented.

If found that the target headway is greater than the current headway, elastic ACC is implemented using the following steps.

The ego vehicle determines the current headway and a current velocity and acceleration of the forward vehicle relative to the ego vehicle. These values can be found using the perception stack 104. The relative velocity and acceleration may be provided by the perception stack 104 (e.g. the perception stack 104 may measure these directly). Alternatively, a current absolute velocity and acceleration of each vehicle, where absolute refers to the velocity or acceleration relative to the road, may be provided by the perception stack 104, and then the relative velocity and acceleration calculated by finding the difference between absolute speeds and velocities of the two vehicles. The relative velocity and acceleration may be calculated by a different system, that is it may not be calculated by a perception algorithm.

For example, the ego vehicle may first determine the current velocity and acceleration of both the ego vehicle itself and the forward vehicle. The ego vehicle velocity is known by the ego vehicle, and its historical velocities can be used to find its current acceleration. Alternatively, the current acceleration may be derived from the derivative of its velocity. Alternatively, there may be an accelerometer on the vehicle which is used to determine the current acceleration of the vehicle. The velocity of the forward vehicle is found using one or more sensors positioned on the ego vehicle, such as radar or laser sensors. The acceleration of the forward vehicle is calculated. For example, it may be derived as the filtered derivative of the forward vehicle velocity. Other calculated forms of forward vehicle acceleration may be used, such as the raw acceleration calculated as a derivative of velocity or DOD acceleration.

The current headway may also be found using one or more sensors of the sensor system 110 positioned on the ego vehicle, such as radar or laser sensors. These may be the same sensors as those use to find the velocity of the forward vehicle or they may be different sensors.

It will be appreciated that the sensor system 110 may comprise a single sensor or it may comprise multiple sensors. Multiple sensors may be used so that external vehicles which are not positioned directly in front of the ego vehicle may be monitored. In addition, multiple sensors may be used when determining the velocity and acceleration of the forward vehicle cutting-in or on traveling on bends in the road or roundabouts, since it will not always be in the line-of-sight of a forward-facing sensor, although still along the path of the ego vehicle.

Using the current velocities and accelerations of the ego and forward vehicle, the headway between the ego vehicle and the forward vehicle is also estimated at a future time is into the future. Such an estimated headway $d_{estimate,t}$ can be found using the following equation:

$$d_{estimate,t} = d_{hw} + \frac{a_{FV} - a_{EV}}{2}t^2 + (v_{FV} - v_{EV})t$$

where $a_{EV}$ and $a_{FV}$ are the current accelerations of the ego vehicle and the forward vehicle respectively, and $v_{EV}$ and $v_{FV}$ are the current velocities of the ego vehicle and the forward vehicle respectively.

In the present example, the time t is a fixed duration of 2 s, although it will be appreciated that any suitable value of t may be used. The value used for the future time needs to be sufficiently far into the future to be a useful prediction, but not so far as to be unrealistic. Here, t=2 has been chosen to allow for fast changes in forward vehicle behaviour, such as accelerating away when first joining a new road, are seen, but also to ensure that any negative behaviours of the forward vehicle, such as slowing down or not accelerating in the above example, are caught and dealt with safety and quickly by implementing the deceleration strategy as defined by the determined risk category.

A set of one or more threshold velocities of the ego vehicle are defined. In the example described herein, two threshold velocities have been defined, a fast threshold velocity, $v_{th\_fast}$=10 m/s, and a slow threshold velocity, $v_{th\_slow}$=5 m/s. These values have been found experimentally. It will be appreciated that other threshold velocities may be used and that there may be any number of threshold velocities defined.

Threshold risk headways are defined associated with each of the threshold velocities. The following definitions for medium- and high-risk headways have been defined respectively:

$$d_{risk\_medium} = \max(v_{EV} \times t_{r\_m}, d_{r\_m\_mm})$$

$$d_{risk\_high} = \max(v_{EV} \times t_{r\_h}, d_{r\_h\_min})$$

where, again, the headway values are in metres, and $v_{EV}$ is the current ego vehicle velocity in m/s, $t_{r\_m}$, and $t_{r\_h}$ are risk headway time values for the medium- and high-risk headways respectively, and $d_{r\_m\_min}$ and $d_{r\_h\_min}$ are the minimum risk headway values for the medium- and high-risk headways respectively. The risk headway time values define the rate at which the medium- and high-risk headways increase as the velocity of the ego vehicle increases. That is, they define how much distance need to be added to the applicable headway as the ego vehicle speed increases. The values used may, for example, be $t_{r\_m}$=2s, $t_{r\_h}$=1s, $d_{r\_m\_min}$=6m, and $d_{r\_h\_min}$=4m. It will be appreciated that other values for these terms may be defined and my depend on any of the algorithm used, the quality of the actuators, and the road conditions.

It can be seen that, in the examples given above, the threshold risk headways are limited. It will be appreciated that this may not always be the case. In this example, they have been limited because, for small velocities, the threshold risk headways become very low. To maintain a clear distinction between the target headway and each threshold risk headway at all speeds, the limiting values have been introduced.

Figure 1B:
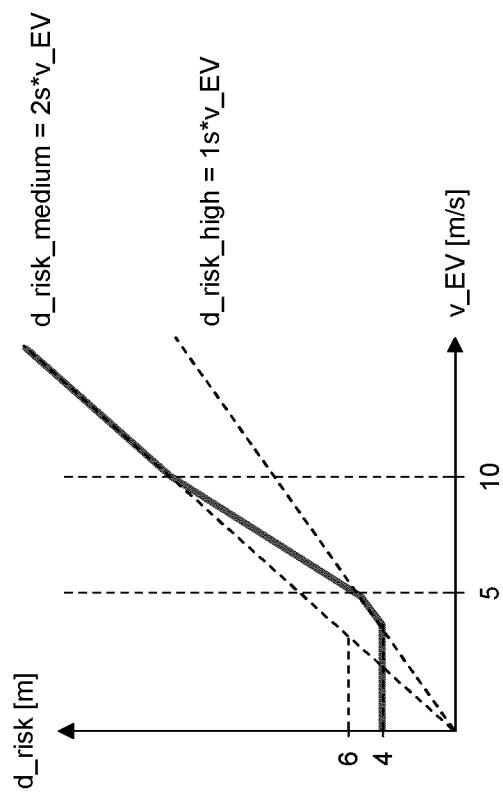
FIGS. 1A and 1B show an example relationship between risk headway and ego vehicle velocity.
Figure 1A:
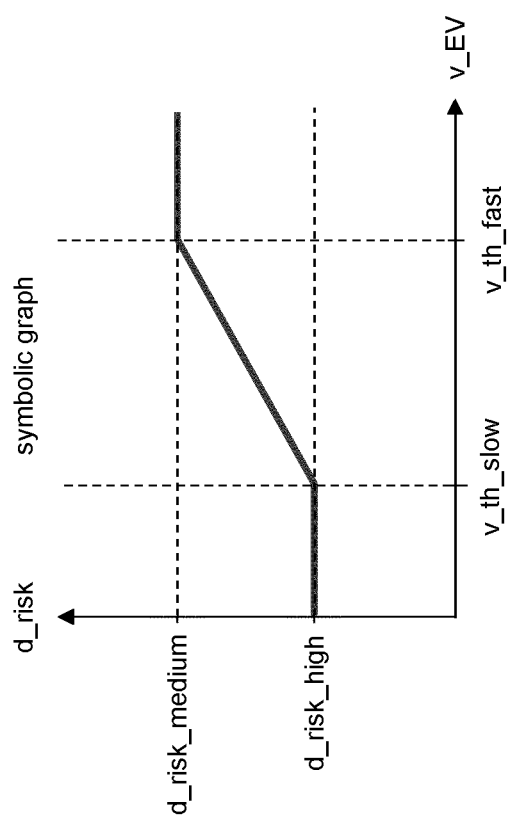

A velocity-dependent risk headway $d_{risk}$ is calculated, which is dependent on the current velocity of the ego vehicle. The velocity-dependent risk headway function is defined as follows:

if $v_{EV} < v_{th\_slow}$, $d_{risk} = d_{risk\_high}$ if $v_{th\_slow} \leq v_{EV} \leq v_{th}$, $d_{risk} = d_{risk\_high} + \dfrac{d_{risk\_medium} - d_{risk\_high}}{v_{th\_fast} - v_{th\_slow}}(v_{EV} - v_{th\_slow})$ if $v_{EV} > v_{th\_fast}$, $d_{risk} = d_{risk\_medium}$ FIGS. 1A and 1B illustrate the relationship between the velocity-dependent risk headway and the ego vehicle velocity. It can be seen form FIG. 1A that the value of the velocity-dependent risk headway when the ego vehicle velocity is between the slow and fast threshold velocities is an interpolation between the high- and medium-risk headways. It will be appreciated that FIG. 1A is highly conceptual. It does not reflect that the threshold risk headways are dependent on the current velocity of the ego vehicle. Rather, it shows the risk headway as a function of the threshold risk headways. FIG. 1B shows the same relationship, but shows the dependency of the risk headway on the current velocity of the ego vehicle. It uses the defined values of the velocity thresholds and the functions defining the medium- and high-risk headways as set out above.

The effects of the threshold velocities, minimum risk headway values and risk headway time values on the risk headway can be clearly seen in the graphs of FIGS. 1A and 1B.

Once the values of $d_{hw}$, $d_{estimate\_t}$ and $d_{risk}$ have been found, the risk category of the ego vehicle can be identified. In this example, three risk categories are defined. However, it will be appreciated that any number of risk categories may be defined using the combinations of threshold risk headways and the target headway.

In the above equations, the magnitude of the velocity and acceleration vectors is used. The magnitudes used for the velocity and acceleration of the ego vehicle are the absolute values. It is possible to simply take the magnitude of the velocity for the purpose of applying elastic ACC, because the forward vehicle is assumed to be travelling in the same direction along the path of the ego vehicle.

The path of the ego vehicle is planned by the path planning process 106a of the planner 106. The movement of the external vehicles is monitored by the perception stack 102 and these perceived movements used to determine which, if any, of the external vehicles is the forward vehicle, travelling along substantially the same path as the ego vehicle in the same direction, and the velocity and acceleration of the forward vehicle.

The elastic ACC system can use the planned path of the ego vehicle, as planned by the planning module 106, and the predicted path of the external vehicles, as predicted by the prediction module 104, to determine when an external vehicle may move in front of the ego vehicle with a headway which is below the target headway.

The elastic ACC system may also have access to maps and GPS data regarding the vehicle's location. This allows the elastic ACC system to know what to expect from the forward vehicle.

For example, the elastic ACC system would know if the ego vehicle were approaching a sharp corner, so that it would know that the forward vehicle will appear to disappear from the view of the ego vehicle when it turns the corner, and reappear once the ego vehicle has turned the corner. Known ACC systems are not able to be used around sharp corners.

It should be noted that the risk category only need be determined if the current headway is smaller than the target headway. That is, the risk category need only be determined if elastic ACC is implemented.

The risk category defines a deceleration strategy to be implemented by the ego vehicle. The deceleration strategy defines how the ego vehicle actively increases the headway between itself and the forward vehicle. The ego vehicle acts to actively increase its headway in a safe manner, and, if possible, also a comfortable manner. The level to which comfort can be considered depends on the risk category. That is, the deceleration strategy is determined so as to selectively optimise for comfort when it is deemed safe to do so.

The deceleration strategy either defines that the ego vehicle increases its headway without any output limiting, i.e. it does not take comfort into account, or the headway is increased to the target headway within a specific time, which takes comfort into consideration. The specific time is referred to as the reaction time $t_{react}$. The reaction time is achieved by limiting the deceleration output of the adaptive cruise controller. The equation which may be used for this is defined in Appendix 1 and is described in more detail later. A controller of the ego vehicle implements the deceleration strategy as defined by the risk category.

In the present example, three risk categories are defined. These are set out below.

Category 1—Low Risk

If it is determined that both the current headway and the estimated headway at time t (in this example, t=2 s) are greater than the velocity-dependent risk headway, the risk to the ego vehicle is categorised as low. In such a scenario, the cut-in vehicle is at a distance greater than the risk headway and the headway is either increasing or only slowly decreasing, such that the headway after 2 s is still above the risk headway.

This is considered a low risk situation for the ego vehicle since the actual headway is still greater than the risk headway after the time t. There is no immediate danger of collision with the forward vehicle. While the vehicle is traveling at a headway above the velocity-dependent risk headway, the ego vehicle can still stop, if required, within the current headway without colliding with the forward vehicle. Thus, the vehicle need not brake sharply, such that jerk, which may be uncomfortable for the passengers, can be avoided.

The deceleration strategy implemented in such a scenario is that of "acceleration clamping", which is described in detail later. That is, ACC is implemented with a time restraint of the reaction time. The reaction time may be set to any reasonable time period. In this example, the reaction time is the lesser of the time at which the estimated headway is equal to the velocity-dependent risk headway and a predetermined risk time, here 5 s. In some embodiments, the predetermined risk time may be variable. For example, the predetermined risk time may be dependent on the current speed of the vehicle. Acceleration clamping is described in more detail later.

The time at which the estimated headway is equal to the velocity-dependent risk headway may be found by calculating the estimated headway over a range of times up to the maximum allowed reaction time, such as between t=0 s and t=5 s at 0.1 second intervals. The results are stored in a lookup table. The time t corresponding to the estimated headway which equals the velocity-dependent risk headway is determined to be the reaction time. This may be found using a reverse search in the lookup table of $d_{estimate}$ as calculated above, to find the value $t_{risk}$ when $d_{estimate}(t_{risk})$ $=d_{risk}$. If no such value has been calculated, the time t required must be greater than the maximum reaction time allowed, here 5 s, so the reaction time is set to the maximum allowable time, 5 s.

Category 2—Medium Risk

If it is determined that the current headway is greater than the velocity-dependent risk headway, but that the estimated headway at time t is smaller than the velocity-dependent risk headway, the risk to the ego vehicle is categorised as medium. In such a scenario, the cut-in forward vehicle is at a distance greater than the risk headway initially, but is not accelerating quickly enough relative to the ego vehicle to maintain a headway greater than the risk headway, so after 2 s the headway is reduced to below the velocity-dependent risk headway.

This is considered a medium risk situation for the ego vehicle since the current headway is not considered a risk, but the headway after 2s is. If, for example, the forward vehicle was to suddenly stop, the ego vehicle would be able to stop without colliding at the current time, but if the forward vehicle were to suddenly stop after 2s, there is a risk of collision. Thus, the ego vehicle needs to actively reduce the headway more urgently than in a low risk situation.

Since the headway is closing quickly in a medium risk scenario, the comfort of the passengers is not considered to be of higher priority. Rather, safety is prioritised. The deceleration strategy implemented in such a scenario is referred to as 'slowdown', such that a slowdown command is implemented by the slowdown process 106b of the planner 106. Slowdown is described in more detail later.

Category 3—High Risk

If it is determined that the current headway is less than the velocity-dependent risk headway, the risk to the ego vehicle is categorised as high. In this category, the headway at time t is not considered since there is an immediate risk. This situation would occur if, for example, the cut-in vehicle moved in front of the ego vehicle at an unsafe distance, i.e. at a distance less than the velocity-dependent risk headway.

This is considered a high-risk situation since the ego vehicle may not be able to stop without colliding with the forward vehicle if the forward vehicle was to stop immediately. Thus, the ego vehicle needs to actively reduce the headway more urgently than in a low or medium risk situation.

Since the current headway is below the risk headway in a high-risk scenario, the comfort of the passengers is not considered a high priority. Rather, safety is prioritised. The deceleration strategy implemented is also slowdown 106b.

Table 1 summaries these categories.

TABLE 1

Reaction times of the ego vehicle to reach the target headway, depending on the current and estimated headways.

| Rule Case | $d_{hw}$ | $d_{estimate}$ $t = 2$ s | Description | $t_{react}$ |
|---|---|---|---|---|
| 1 Above risk headway and maintaining or increasing | $\geq d_{risk}$ | $\geq d_{risk}$ | Cut-in vehicle is above risk headway and headway increasing or slowly decreasing | $=t_{d_{estimate}=d_{risk}}$ $\leq 5$ s |

TABLE 1-continued

Reaction times of the ego vehicle to reach the target headway, depending on the current and estimated headways.

| Rule Case | $d_{hw}$ | $d_{estimate}$ $t = 2$ s | Description | $t_{react}$ |
|---|---|---|---|---|
| 2 Above risk headway and decreasing | | $<d_{risk}$ | Cut-in vehicle is above risk headway and headway is closing quickly, hence the ego vehicle reaction should not be limited with any comfortability constraints. | No limiting |
| 3 Below risk headway | $<d_{risk}$ | | Cut-in vehicle is below risk headway, hence the ego vehicle reaction should not be limited with any comfortability constraints. | No limiting |

The risk categories set out above allow the elastic ACC system to selectively optimise the braking of the ego vehicle for comfort.

Note the action taken in the medium- and high-risk categories is the same. Conceptually, it is useful to consider three risk categories. However, in practice, the ACC may operate according to two discrete risk categories only—a first in which comfort constraints are not applied, and a second in which they are. That is, the medium and high-risk category may in fact be the same risk category (first risk category), distinct from the second comfort-constrained risk category.

In some embodiments, there may be additional risk categories. For example, there may be an additional "medium" risk category between rule cases 1 and 2 of Table 1, where the headway is decreasing, but not quickly. In such a scenario, slowdown may be implemented but with restraints on the breaking allowed. Alternatively, acceleration clamping may be implemented but with a lower allowable reaction time.

Acceleration Clamping

Acceleration clamping is one type of deceleration strategy which may be implemented by the ego vehicle. In the above example it is implemented when the risk is categorised as low.

The following equation may be used to calculate a required braking acceleration of the ego vehicle:

$$a_{EV\_breaking} = \frac{d + v_{FV}t + \frac{a_{FV}}{2}t^2 - v_{EV}(t + T_t) - d_0}{tT_t + \frac{t^2}{2}}$$

where $t=t_{react}$, $d=d_{hw}$, and $T_t$, and $d_0$ are the components of the target headway time which are derived from the target time gap and target static gap respectively, that is, they are the predetermined time value and the predetermined distance value respectively, as defined with reference to the equation for $d_{target}$ above. A derivation of the equation for acceleration clamping can be found in Appendix 1.

If the value calculated for the braking acceleration to be implemented by the ego vehicle is found to be greater than zero, the braking acceleration is set to zero. That is, the ego vehicle cannot be set to accelerate in response to a cut-in vehicle or any other situation in which the current headway is found to be less than the target headway.

Acceleration clamping may not be implemented if the forward vehicle is deemed to be static. A minimum forward vehicle velocity and acceleration may be defined which act as threshold values. If the forward vehicle is travelling with a velocity and acceleration below these threshold values, the forward vehicle is deemed to be static. The ego vehicle, therefore, does not implement acceleration clamping but rather implements slowdown.

Slowdown

Slowdown is a second type of deceleration strategy which may be implemented by the ego vehicle. In the above example, it is implemented when the risk category is medium or high.

In this situation, slowdown constitutes an emergency braking procedure that is used to restore safe driving conditions (i.e. current and predicted headways at or above the target headway). This may, for example, assume a "worst case" scenario of the forward vehicle remaining stationary at its current position. That is, the forward vehicle is assumed to not be moving forwards such that the ego vehicle must stop before reaching the current position of the forward vehicle. This is achieved by applying sufficient aggressive braking which would allow the ego vehicle to be brought to a complete halt before it reaches the current position of the forward vehicle (the point at which it would otherwise collide with the forward vehicle if the forward vehicle were to remain stationary). This safety requirement is a hard constraint imposed at the expense of comfort to the extent necessary. Note implementing slowdown will not necessarily result in the ego vehicle coming to a complete holt—once safe driving conditions have been restored, ACC may resume accordingly in some implementations.

In both ACC and slowdown, the ego and forward vehicles are assumed to be travelling in a straight line when calculating the required deceleration.

The deceleration strategy associated with the determined risk category is implemented by a controller of the ego vehicle. The deceleration strategy is implemented until the current headway is equal to the target headway. In some embodiments, the target headway is continuously recalculated, or recalculated after a pre-defined time period. For example, the target headway may be recalculated every 2s. This updates the target headway to match the reduced speed of the ego vehicle. In other embodiments, the deceleration strategy is implemented until the current headway is equal to the target headway as calculated prior to the implementation of the deceleration strategy.

It will be appreciated that, although the presented method is described with reference to when a vehicle cuts-in in front of the ego vehicle, the ego vehicle may be checking the target headway and assessing the risk category continuously. Alternatively, the ego vehicle may check these criteria at pre-defined time intervals, for example every 0.05-0.1s.

Figure 4:
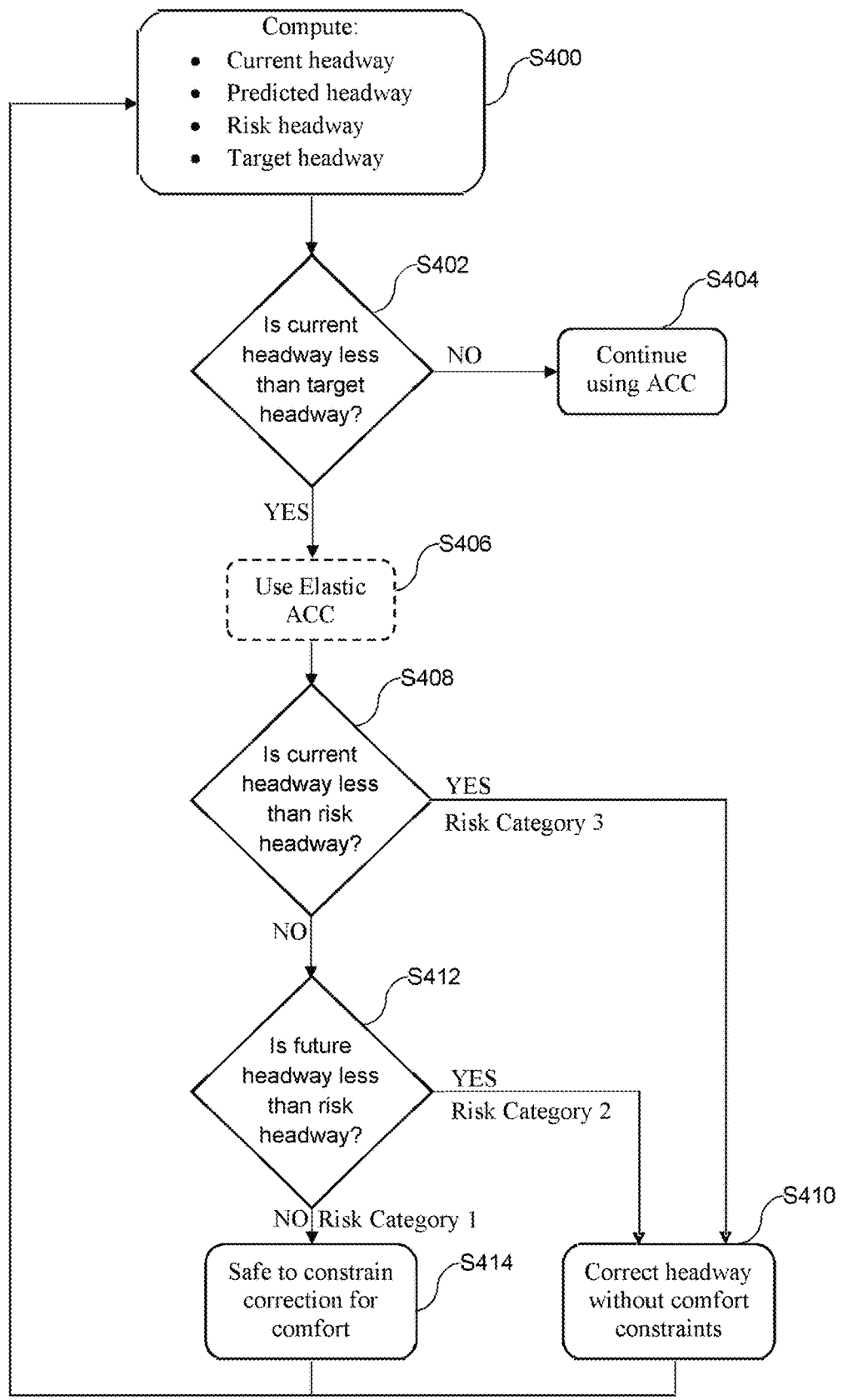
FIG. 4 shows an example process implemented by the system.

FIG. 4 shows an example process for determining the risk category. At step S400, the current headway and target headway are computed. These are calculated using the equations set out above, using data collected by the perception system. The current and risk headways may be calculated by a component common to both the elastic ACC system 107 and a "normal" ACC system 904, as described later, since, as step S400, is has not yet been determined if elastic ACC is to be implemented or if known ACC is to be used.

At step S402, it is determined if the current headway is less than the target headway. That is, is the ego vehicle travelling at a distance behind the forward vehicle which is deemed to be unsafe. If the current headway is greater than the target headway, the process proceeds to step S404, where the system continues to use ACC as known in the art.

However, if the current headway is less than the target headway, the system implements elastic ACC, step S406.

At step S408, further values are calculated. Here, the predicted headway at time t and the velocity-dependent risk headway are calculated. The threshold risk headways may also be computed at step S408 in order to calculate the velocity-dependent risk headway.

At step S410, it is determined if the current headway is less than the risk headway. If it is, the ego vehicle is determined to be in a high-risk scenario, so the headway is corrected without comfort constraints, step S412. This is the case for the example risk category 3, as set out above. When the headway is corrected without comfort constraints, a slowdown command is implemented.

If, however, it is found at step S410 that the current headway is greater than the risk headway, it is determined if the future headway is less than the risk headway, step S414.

If the risk headway is greater than the predicted headway at the predetermined future time, the forward vehicle is accelerating too slowly for the current velocity and acceleration of the ego vehicle. As such, the ego vehicle is in a medium-risk scenario, risk category 2 above. Thus, it corrects the headway without comfort constraints, step S412, so implements a slowdown command.

If, however, the future headway is greater than the risk headway, the ego vehicle is deemed to be in a low-risk environment, risk category 1 above. Thus, it is deemed safe to constrain the headway correction for comfort, step S416.

Once a risk strategy has been identified and a deceleration strategy implemented, the process returns to step S400 and repeats.

The process may repeat continuously, such that the deceleration strategy implemented is updated depending on the current scenario. That is, the system continuously measures the current headway and current velocity and acceleration of both the ego and forward vehicles, and calculates the current, target, and risk headways. It then continues to check the current headway against the target and risk headways to determine the deceleration strategy to implement at the current time. For example, if the ego vehicle is found initially to be in a medium-risk category, it reduces the headway without comfort constraints. The ego vehicle continues to recalculate the risk and target headways as the ego vehicle decelerates. Once the ego vehicle is found to be in the low-risk category, the deceleration strategy can be altered such that comfort constraints can be allowed for.

Alternatively, the same deceleration strategy may be implemented until the current headway is greater than or equal to the target headway. In such an embodiment, the target headway may be continuously recalculated as the velocity of the ego vehicle decreases. Alternatively, the target headway used may be that calculated initially, i.e. the target headway calculated when the ego vehicle was travelling at its initial velocity prior to implementing the deceleration strategy.

In some embodiments, the steps of computing headway values S400, S408 may occur at different points of the process. For example, all four headway values discussed in relation to FIG. 4 may be calculated initially at step S400. In other embodiments, the risk headway is computed at step S408, and the predicted headway computed if it is found, at step S410, that the current headway is greater than the risk headway, i.e. the ego vehicle is not in a high-risk scenario.

System Architecture

Figure 2:
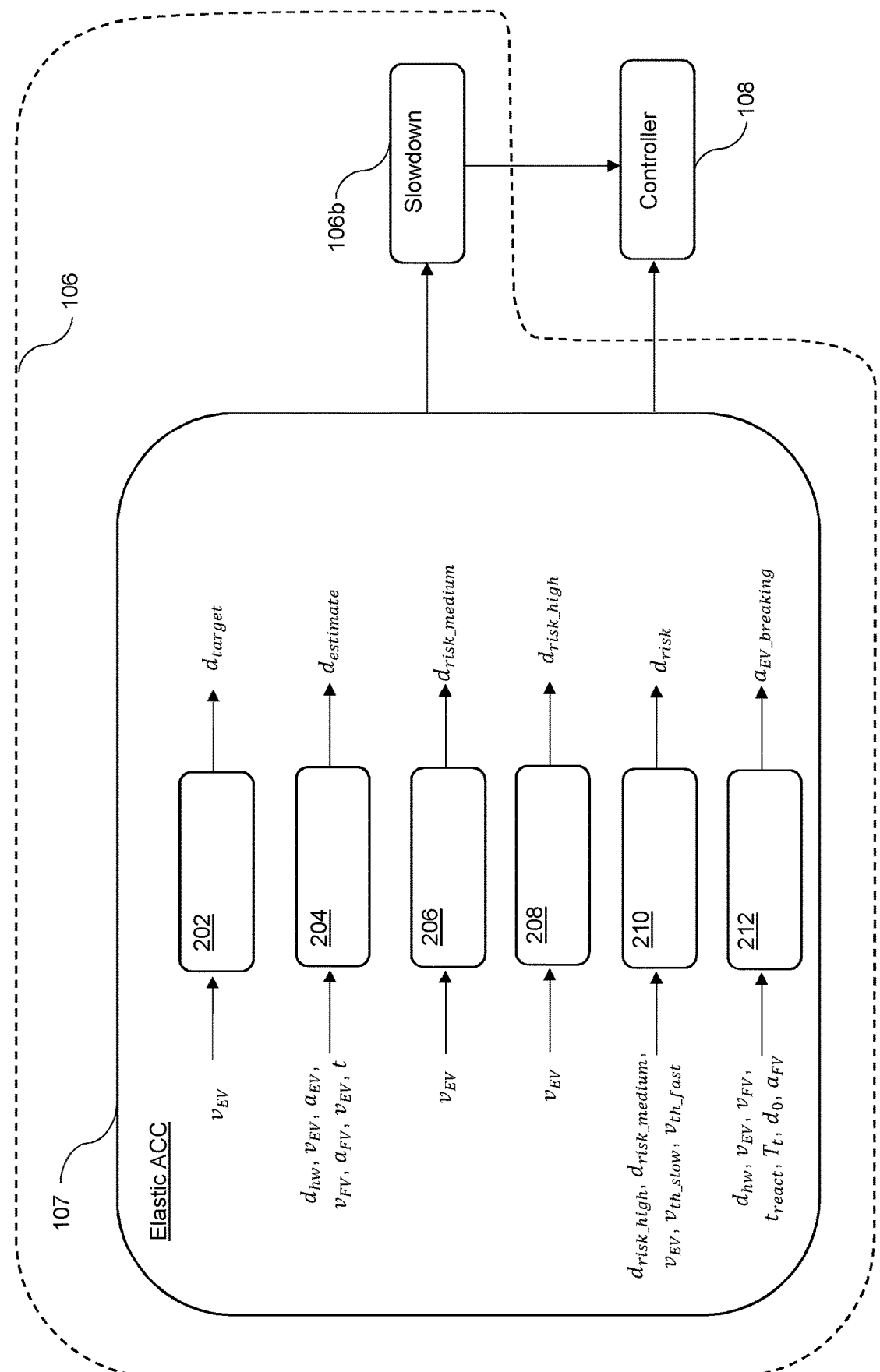
FIG. 2 is a schematic block diagram of an example system used to implement the acceleration control method.

FIG. 2 shows schematic block diagram of an example system used to implement the elastic ACC process 107 described above.

An elastic ACC module 107 is shown, which comprises a number of sub-modules 202, 204, 206, 208, 210, 212 each of which is used to calculate a value used in the method set out above. The sub-modules 202, 204, 206, 208, 210, 212 are shown with their input to the left and their outputs to the right. It will be appreciated that some of these input values are determined by the ego vehicle perception system, such as the ego vehicle velocity $v_{EV}$, while others may be calculated by the elastic ACC module 107 in a different sub-module, for example the threshold medium risk headway $d_{risk\_medium}$. Some input values may be predefined and stored in the system, for example the target time gap $T_t$.

Each sub-module 202, 204, 206, 208, 210, 212 of the elastic ACC module 107 implements a different algorithm to calculate the value to be outputted by the sub-module 202, 204, 206, 208, 210, 212. The equations used to calculate the output for each sub-module 202, 204, 206, 208, 210, 212 are given above.

One of the sub-modules 212 shown is used to calculate the acceleration of the ego vehicle if it is determined that it is safe to correct the headway while taking comfort into consideration. That is, the ego vehicle is in a low-risk scenario, corresponding to the example risk category 1 above.

However, if the ego vehicle is deemed to be in a medium- or high-risk scenario, such that the headway is corrected without comfort constraints, the elastic ACC module 107 is not responsible for determining the braking to be implemented by the ego vehicle. A slowdown component 106b executes the deceleration strategy of the ego vehicle when comfort constraints are not implemented.

With reference to FIG. 4, the elastic ACC module 107 executes steps S400-S410 and S414-S416. However, the slowdown module 106b executes step S412, in response to the steps instigated by the elastic ACC module 107.

The elastic ACC module 107 and the slowdown module 106b are components of the planner 106. Once the accelerations required to be implemented are found by either the elastic ACC module 107 or the slowdown module 106b, the accelerations are passed to the controller 108 which provides the suitable control signals to the actuators of the ego vehicle.

In the example of FIG. 2, the elastic ACC module 107 is responsible for calculating the value of the target headway. It will be appreciated that, in some embodiments, the target headway may be calculated by a different module, for example in an ACC module not shown in FIG. 2. The target headway may then be passed to the elastic ACC module 107 for use in determining the risk category and deceleration strategy.

An example architecture for determining whether to implement elastic ACC is shown in FIG. 9. The planner 106 comprises an ACC module 902. The ACC module 902 comprises the elastic ACC module 107, a "normal" ACC module 904, where "normal" refers to know ACC methods, and a comparison module 906.

The current ego vehicle velocity and the current headway are used by the comparison module 906, which calculates the target headway based on the current ego vehicle velocity and compares this to the current headway. That is, the comparison module 906 can be used to implement steps S400 and S402 of FIG. 4.

If the current headway is greater than the target headway, the current ego vehicle velocity and the current headway are passed to the normal ACC module 904, which implements ACC as known in the art. This is equivalent to step S404 of FIG. 4.

If the current headway is found to be less than the target headway, the current headway and current ego vehicle velocity are passed to the elastic ACC module 107 which calculates the risk headway and determines the deceleration strategy to implement based on the current headway, predicted headway, and risk headway. The elastic ACC module 107 may compute the predicted headway in the planner 106, or it may receive the predicted headway from a sub-module of the prediction stack 104 as shown in FIG. 8.

Figure 8:
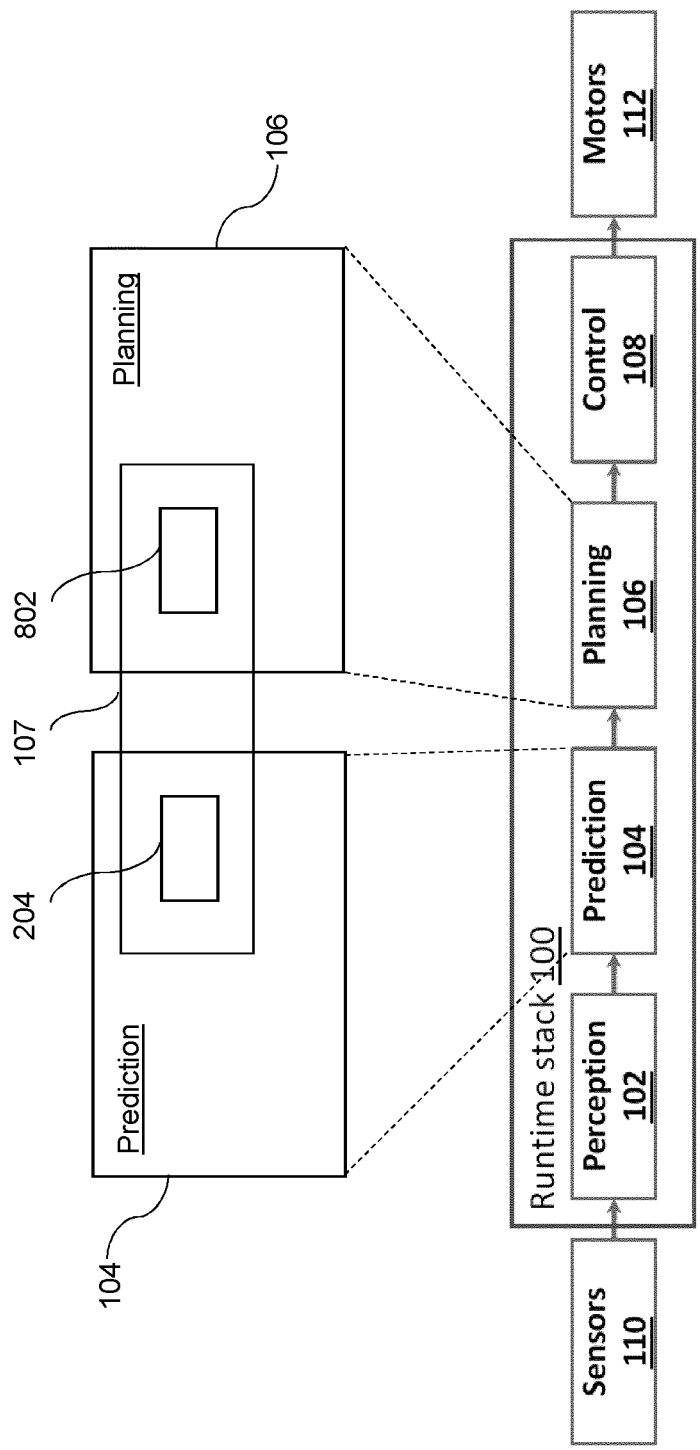
FIG. 8 shows an alternative schematic block diagram of an autonomous vehicle runtime stack for implementing elastic ACC.

The elastic ACC module 107 is shown to encompass elements of both the prediction stack 106 and the planner 107, as illustrated in FIG. 8. The sub-module 204 used to calculate the predicted headway may be implemented by the prediction stack 104, while the other sub-modules 202, 206, 208, 210, 212 may be implemented by a planning module 802 of the elastic ACC module 107 within the planner 106.

In some embodiments, the predicted path of external vehicles as predicted by the prediction stack 104 may be used to anticipate a change in forward vehicle and/or a change in the speed and acceleration of the forward vehicle such that the elastic ACC module 107 uses these predictions to determine the deceleration strategy to implement.

Example Scenarios

Figure 6:
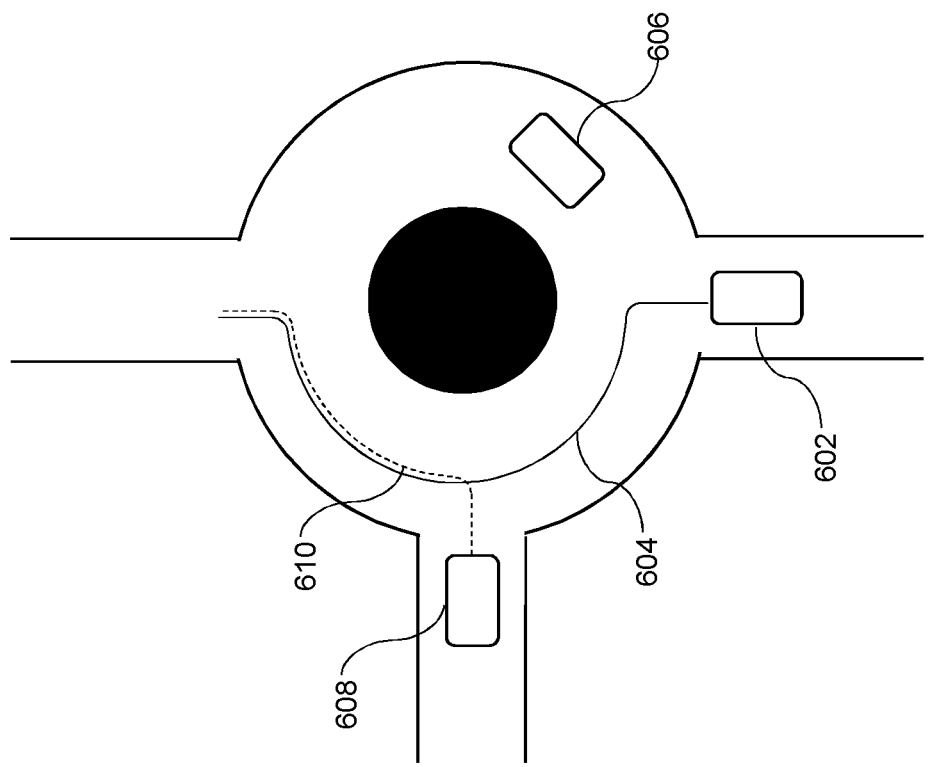
FIG. 6 shows an example of when elastic ACC may be used on a roundabout.
Figure 7:
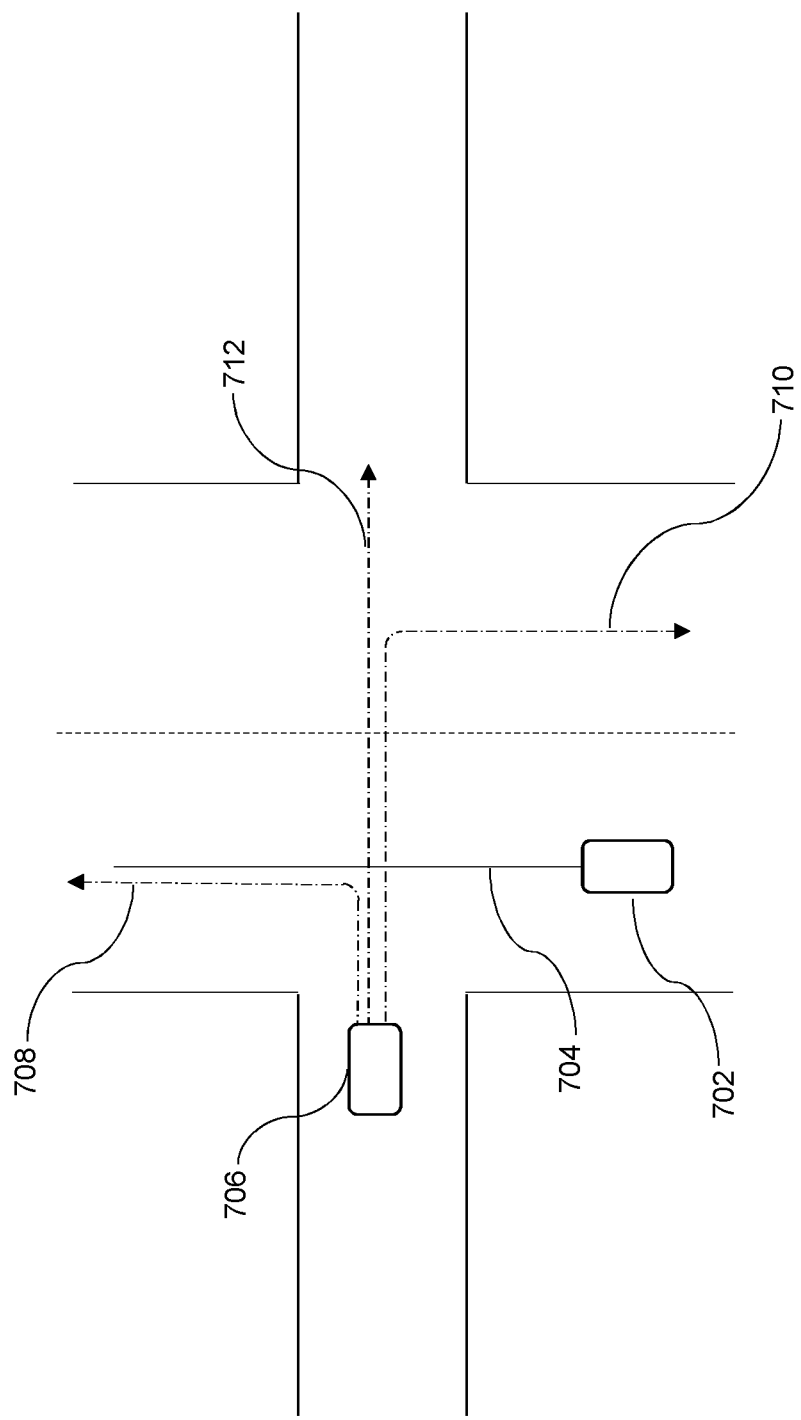
FIG. 7 shows examples of when elastic ACC is implemented and when elastic ACC is not implemented.

FIG. 6 illustrates when elastic ACC 107 is implemented and when it is not. The ego vehicle 702 is shown to be travelling along the planned path 704, as planned by the path planner 106a of the planner 106.

The ego vehicle 702 is travelling along a main road with two side roads, one on either side of the main road. There is an external vehicle 706 approaching the main road from the side road on the left-hand side of the main road. There are three possible paths 708, 710, 712 the external vehicle 706 may take.

The external vehicle 706 may turn right onto the main road, taking path 710. It, therefore, crosses the planned path 704 of the ego vehicle 702, but does not subsequently travel along substantially the same path in the same direction as the ego vehicle 702. Therefore, elastic ACC 107 is not implemented.

The external vehicle 706 may cross the main road to take the side road on the right-hand side of the main road, following path 712. Again, the external vehicle 706 crosses the planned path 704 of the ego vehicle 702, but does not subsequently travel along substantially the same path in the same direction as the ego vehicle 702. As such, elastic ACC 107 is not implemented.

The external vehicle 706 may turn left onto the main road following path 708. Path 708 follows the planned path 704 of the ego vehicle 702 in the same direction. Thus, if the external vehicle 706 takes possible path 708, it is the forward vehicle. Elastic ACC 107 is implemented in this case if the actual headway is found to be less than the target headway.

The velocity of the external vehicle 706 is determined by the perception stack 102, which in turn is used to determine if the external vehicle 706 is following the possible path 708 which follows substantially the same path as the ego vehicle 702, planned path 704.

Figure 3A:
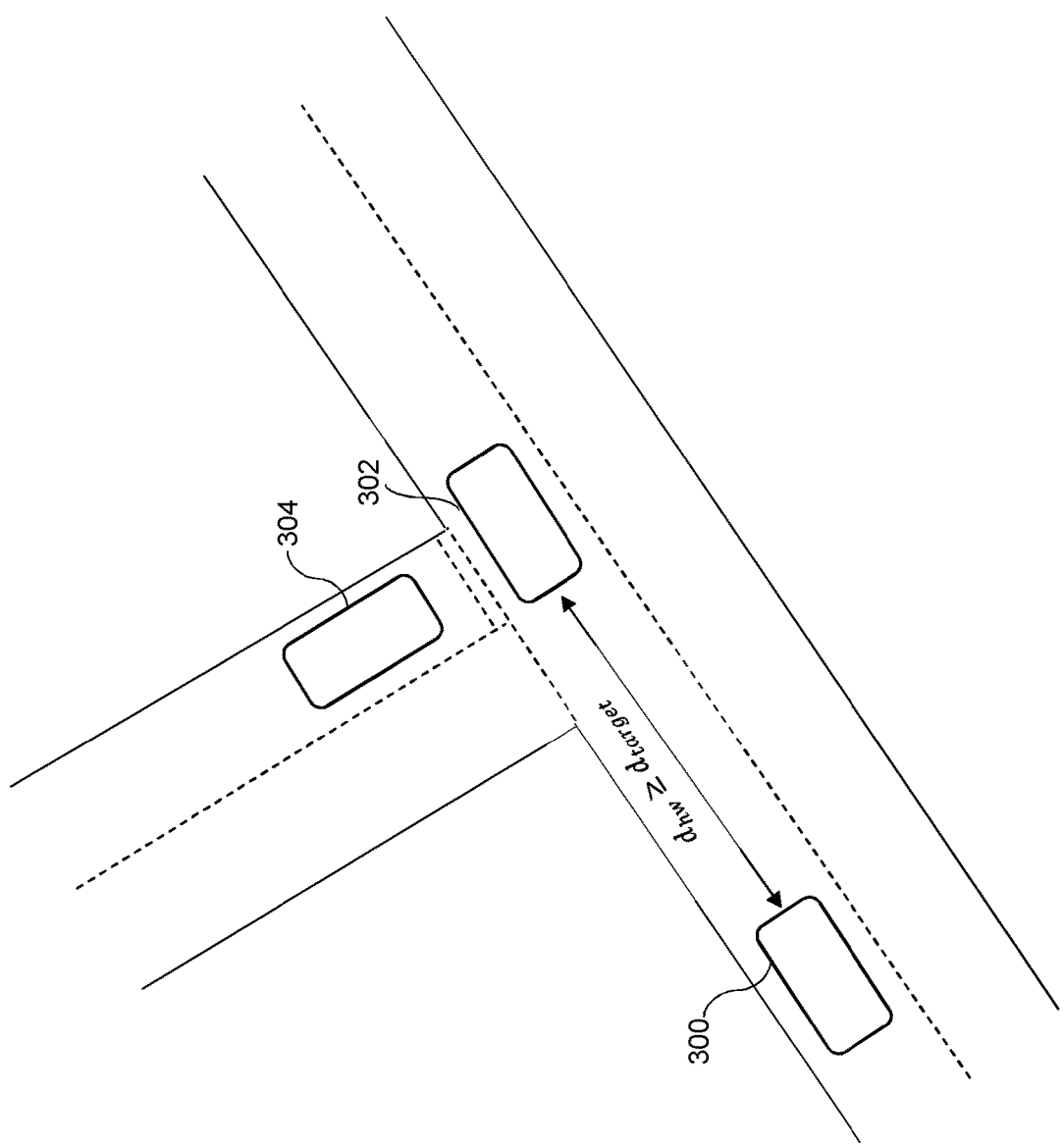
FIGS. 3A-3C show an example scenario in which the disclosed method may be used.
Figure 3B:
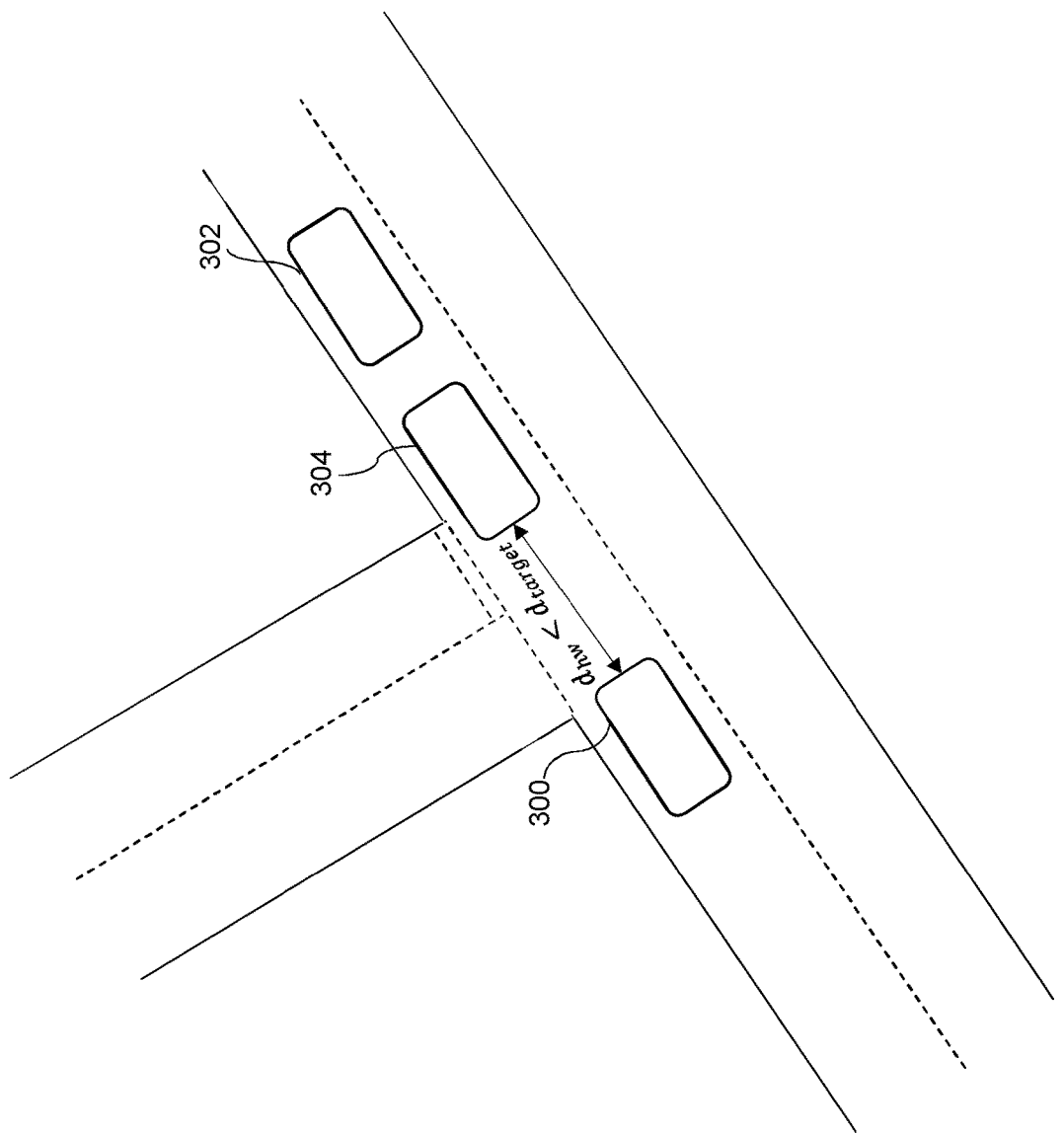
Figure 3C:
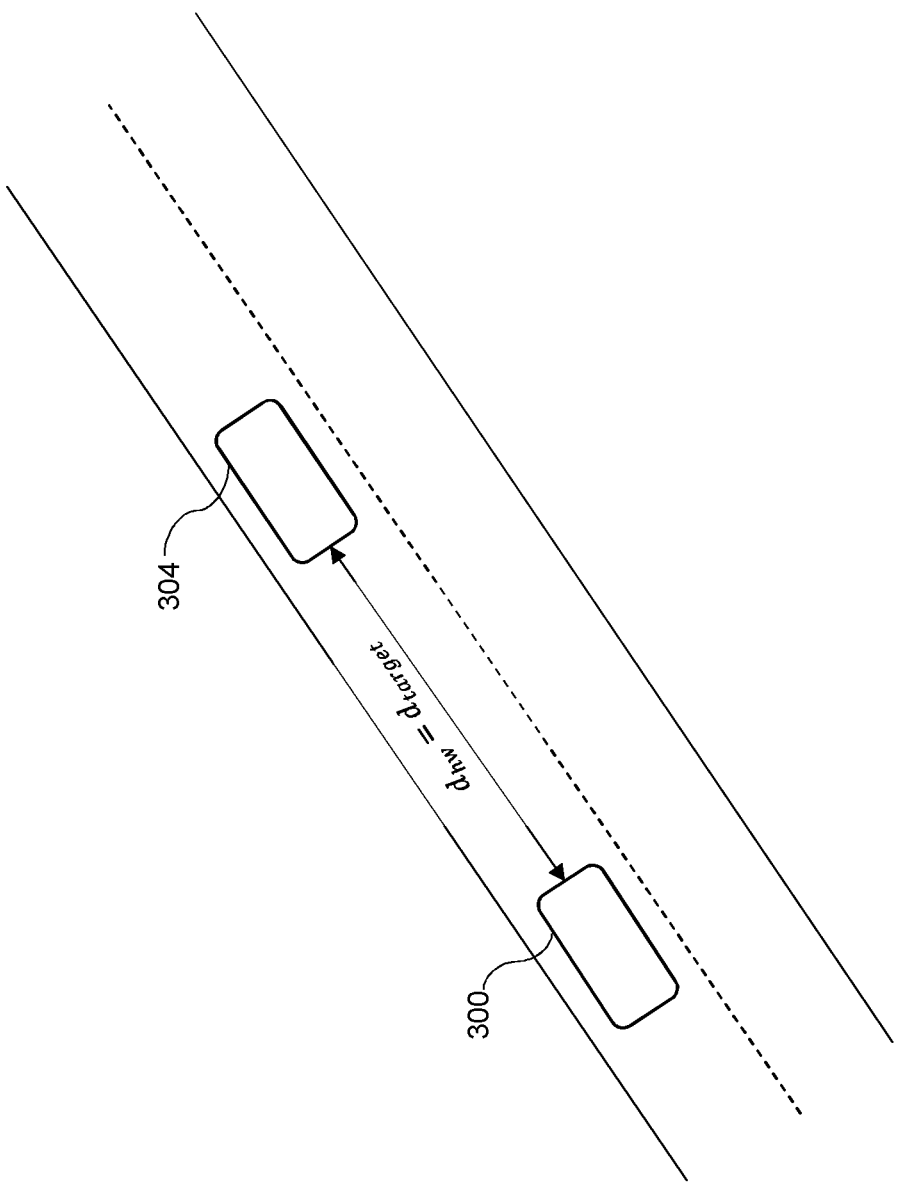

FIGS. 3A-3C show an example scenario in which the present invention may be implemented.

In FIG. 3A, ego vehicle 300 is following a first external vehicle, forward vehicle 302, along a road at a current headway $d_{hw}$. The current headway is greater than or equal to the target headway $d_{target}$ Assuming that both the ego vehicle 300 and the forward vehicle 302 are traveling at the speed limit, the current headway does not increase as the two vehicles 300, 302 travel along the road.

FIG. 3A shows a side road joining the main road. There is a second external vehicle 304 on the side road. FIG. 3B shows the second external vehicle 304 joining the main road in front of the ego vehicle 300 and behind the first external vehicle 302. The ego vehicle 300 now has a current headway which is the distance between itself and the second external vehicle 304, which is now the forward vehicle.

In some scenarios, the current headway between the ego vehicle 300 and the new forward vehicle 304 will be greater than or equal to the target headway, such that the ego vehicle 300 can continue to travel at its current velocity. However, as in the example of FIG. 3B, the new current headway may be less than the target headway. Thus, the ego vehicle must actively increase its headway.

The ego vehicle 300 implements the method set out above, wherein it determines a velocity-dependent risk headway and, based on said risk headway, determines a risk category. The risk category may also be dependent on the expected headway at a future time, e.g. 2s into the future. Once the risk category is determined, the deceleration strategy associated with the determined risk category is implemented. The deceleration strategy is implemented until the current headway between the ego vehicle 300 and the new forward vehicle 304 is equal to the target headway, as shown in FIG. 3C.

Although the present disclosure has used the example of the forward vehicle cutting in front of the ego vehicle, it will be appreciated that the present invention may be used in a number of different scenarios.

For example, elastic ACC 107 may be used when the ego vehicle is navigating a roundabout. A separate process of the planner 106 determines when the ego vehicle joins the roundabout. However, once on the roundabout, elastic ACC 107 is implemented to increase the headway if needed.

FIG. 6 shows an example of an ego vehicle 602 at a roundabout. The path planner 106a of the planner 106 plans the ego vehicle path 604. There are two external agents 606, 608 shown in FIG. 6. The planner 106 uses a predicted path (not shown) of external agent 606, as determined by the prediction stack 104, to decide when the ego vehicle 602 should join the roundabout. This is determined by a process separate to the elastic ACC process 107, such that the elastic ACC process 107 is not concerned with the external vehicle 606 as long as it stays behind the ego vehicle 602 when it travels on its planned path 604.

The ego vehicle 602 enters the roundabout ahead of external vehicle 606 and follows its planned path 604. The external vehicle 608 may enter the roundabout ahead of the ego vehicle 602, following substantially the same path round the roundabout, such that it is the forward vehicle. The perception stack 102 determines the velocity and acceleration of the forward vehicle 608 and passes this information to the planner 106. If it is found that the current headway is smaller than the target headway, the elastic ACC process 107 determines the deceleration strategy to implement, as set out above.

The forward vehicle 608 is assumed to travel along the same path as the ego vehicle 602. The forward vehicle path 610 used by the elastic ACC process 107 is shown in FIG. 6. It should be noted that this path need not be predicted by the prediction stack 104, but rather assumed to follow the ego vehicle planned path 604.

It will be appreciated that, in this example, the elastic ACC process does not consider the velocity, acceleration, or path of external vehicle 606 as it is behind the ego vehicle 602. However, if the ego vehicle 602 entered the roundabout after external vehicle 606 had passed the exit from which the ego vehicle 602 entered, the external vehicle 606 would be the forward vehicle. As such, the elastic ACC process 107 would determine the decelerations strategy to be implemented, if required, based in the velocity and acceleration of the external vehicle 606.

An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver.

The runtime stack 100 of FIG. 1 is implemented by an on-board computer system of the AV (not shown). The on-board computer system comprises execution hardware which is configured to execute the method/algorithmic steps disclosed herein. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Exampled of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable though circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

Appendix 1: Equation for Acceleration Clamping $t = t_{react}$ reaction time given $d = d_{Inv}$ initial headway T target headway time, comprised of time gap $T_t$ and a static gap $T_d$ component D target headway distance $$T = T_t + T_d = T_t + \frac{d_0}{v_{EV} + a_{EV}t}$$

$D = (v_{EV} + a_{EV}t)T$, both assuming constant deceleration over timespan t $$D = (v_{EV} + a_{EV}t)\left(T_t + \frac{d_0}{v_{EV} + a_{EV}t}\right) = d + v_{FV}t + \frac{a_{FV}}{2}t^2 - v_{EV}t - \frac{a_{EV}}{2}t^2$$

$$(v_{EV} + a_{EV}t)\left(T_t + \frac{d_0}{v_{EV} + a_{EV}t}\right) + \frac{a_{EV}}{2}t^2 = d + v_{FV}t + \frac{a_{FV}}{2}t^2 - v_{EV}t$$

$$v_{EV}T_t + a_{EV}tT_t + \frac{a_{EV}}{2}t^2 + \frac{d_0(v_{EV} + a_{EV}t)}{v_{EV} + a_{EV}t} = d + v_{FV}t + \frac{a_{fv}}{2}t^2 - v_{EV}t$$

$$a_{EV}\left(tT_t + \frac{t^2}{2}\right) + d_0 = d + v_{FV}t + \frac{a_{FV}}{2}t^2 - v_{EV}(t + T_t)$$

$$\boxed{a_{EV} = \frac{d + v_{FV}t + \frac{a_{FV}}{2}t^2 - v_{EV}(t + T_t) - d_0}{tT_t + \frac{t^2}{2}}}$$

Note: $a_{EV}$ can become positive in some cases and should be limited to 0

The invention claimed is:

1. An adaptive cruise controller for autonomously adapting the speed of an ego vehicle to maintain a target headway, headway being distance from the ego vehicle to a forward vehicle, the ego vehicle equipped with a perception system for measuring a current headway and a current speed and acceleration of the forward vehicle relative to the ego vehicle, the adaptive cruise controller comprising:
 a comparison module configured to determine if the current headway is below the target headway; and
 an elastic adaptive cruise control module configured to, in response to detecting that the current headway is below the target headway, determine a deceleration strategy for increasing to the target headway; and
 a controller configured to implement the deceleration strategy;
 wherein the deceleration strategy is determined so as to selectively optimize for comfort in dependence on a predicted headway, the predicted headway computed for a future time instant based on the current speed and acceleration of the forward vehicle relative to the ego vehicle.

2. The adaptive cruise controller of claim 1, wherein the deceleration strategy is determined so as to selectively optimize for comfort in dependence on the current headway and the predicted headway.

3. The adaptive cruise controller of claim 1, configured to:
determine a risk headway less than the target headway; and
compare the predicted headway with the risk headway, the deceleration strategy selectively optimized for comfort in dependence thereon.

4. The adaptive cruise controller of claim 3, wherein the risk headway is determined based on a measured absolute speed of the ego vehicle.

5. The adaptive cruise controller of claim 4, wherein the risk headway $d_{risk}$ is computed as:

$$v_{EV} < v_{th\_slow} \rightarrow d_{risk} = d_{risk\_high}$$

$$v_{th\_slow} \leq v_{EV} \leq v_{th\_fast} \rightarrow d_{risk} = d_{risk\_high} + \frac{d_{risk\_medium} - d_{risk\_high}}{v_{th\_fast} - v_{th\_slow}}(v_{EV} - v_{th\_slow})$$

$$v_{EV} > v_{th\_fast} \rightarrow d_{risk} = d_{risk\_medium}$$

in which:

$$d_{risk\_medium} = \max(v_{EV} \times t_{0,risk\_medium}, d_{0,risk\_medium}),$$

$$d_{risk\_high} = \max(v_{EV} \times t_{0,risk\_high}, d_{0,risk\_high}),$$

wherein $t_{0,risk\_medium}$ and $t_{0,risk\_high} < t_{0,risk\_medium}$ are predetermined time values,
wherein $d_{0,risk\_medium}$ and $d_{0,risk\_high} < d_{0,risk\_medium}$ are predetermined distance values, and
wherein $v_{th_{slow}}$ and $v_{th_{fast}}$ are predetermined speed thresholds.

6. The adaptive cruise controller of claim 3, wherein the risk headway and the predicted headway are used to determine whether or not to impose a comfort constraint on the deceleration strategy.

7. The adaptive cruise controller of claim 6, wherein the comfort constraint limits the acceleration of the ego vehicle based on a reaction time, the reaction time determined by estimating a time until the risk headway is reached based on the current speed and acceleration of the forward vehicle relative to the ego vehicle.

8. The adaptive cruise controller of claim 7, wherein the reaction time is the lesser of: the estimated time until the risk headway is reached, and a predetermined risk time.

9. The adaptive cruise controller of claim 7, wherein the estimated reaction time t is used to compute an acceleration limit for the ego vehicle as:

$$a_{EV} = \frac{d + v_{FV}t + \frac{a_{FV}}{2}t^2 - v_{EV}(t + T_t) - d_0}{tT_t + \frac{t^2}{2}},$$

where d is the current headway, $v_{FV}$ is a current absolute speed of the forward vehicle, $a_{FV}$ is a current absolute acceleration of the forward vehicle, $v_{EV}$ is a current absolute speed of the ego vehicle, $T_t$ is a predetermined time value, and $d_0$ is a predetermined distance value.

10. The adaptive cruise controller of claim 9, wherein the acceleration of the ego vehicle is limited to $a_{EV}$ in the case that $a_{EV} \leq 0$ but to zero in the event that $a_{EV} > 0$.

11. The adaptive cruise controller of claim 6, wherein:
if both the current headway and the predicted headway are above the risk headway, the comfort constraint is imposed; and
if either of the current headway or the predicted headway is below the risk headway, the comfort constraint is not imposed.

12. The adaptive cruise controller of claim 5, wherein in the case that the comfort constraint is not imposed, the deceleration strategy comprises initiating an emergency braking procedure.

13. The adaptive cruise controller according to claim 12, wherein the emergency braking procedure implements sufficiently aggressive braking such that the ego vehicle can be brought to a complete halt before reaching a current location of the forward vehicle.

14. The adaptive cruise controller of claim 1, wherein the future time instant is a fixed duration from a current time instant at which the current headway and the current speed and acceleration of the forward vehicle relative to the ego vehicle are measured.

15. The adaptive cruise controller of claim 1, wherein the current speed and acceleration of the forward vehicle relative to the ego vehicle are determined using a measured absolute speed or velocity and acceleration respectively of both the ego vehicle and the forward vehicle, the absolute acceleration of each vehicle and the absolute speed or velocity of the each vehicle provided by the perception system.

16. The adaptive cruise controller of claim 1, wherein the current speed and acceleration of the forward vehicle relative to the ego vehicle are provided directly by the perception system.

17. A non-transitory computer readable medium storing computer program instructions, the computer program instructions configured so as, when executed on one or more hardware processors, to implement an adaptive cruise control method for autonomously adapting the speed of an ego vehicle to maintain a target headway, headway being distance from the ego vehicle to a forward vehicle, the ego vehicle equipped with a perception system for measuring a current headway and a current speed and acceleration of the forward vehicle relative to the ego vehicle, by:
responsive to detecting that the current headway is below the target headway, determining and implementing a deceleration strategy for increasing to the target headway;
wherein the deceleration strategy is determined so as to selectively optimize for comfort in dependence on a determined risk category of the ego vehicle, the risk category determined as one of a discrete set of risk categories based on the current speed and acceleration of the forward vehicle relative to the ego vehicle.

18. An adaptive cruise control method for autonomously adapting the speed of an ego vehicle to maintain a target headway, headway being distance from the ego vehicle to a forward vehicle, the ego vehicle equipped with a perception system for measuring a current headway and a current speed and acceleration of the forward vehicle relative to the ego vehicle, the method comprising:
- in response to detecting that the current headway is below the target headway, determining and implementing a deceleration strategy for increasing to the target headway;
- wherein the deceleration strategy is determined so as to selectively optimize for comfort in dependence on a predicted headway, the predicted headway computed for a future time instant based on the current speed and acceleration of the forward vehicle relative to the ego vehicle.

19. The adaptive cruise controller according to claim 1 embodied on a semi- or fully autonomous vehicle.

20. The semi- or fully-autonomous vehicle according to claim 19, wherein the vehicle comprises a sensor system providing a coverage range between 180° and 360°.

\* \* \* \* \*